United States Patent
Moore et al.

(10) Patent No.: US 8,939,294 B2
(45) Date of Patent: Jan. 27, 2015

(54) BLOCK COPOLYMER MEMBRANES AND ASSOCIATED METHODS FOR MAKING THE SAME

(75) Inventors: David Roger Moore, Rexford, NY (US); Hongyi Zhou, Niskayuna, NY (US); Matthew Jeremiah Misner, Delanson, NY (US); Xiaohui Chen, Niskayuna, NY (US); Lifeng Zhang, Clifton Park, NY (US); Daniel Joseph Brunelle, Burnt Hills, NY (US); Minglin Ma, Cambridge, MA (US)

(73) Assignee: General Electric Company, Niskayuna, NY (US)

( * ) Notice: Subject to any disclaimer, the term of this patent is extended or adjusted under 35 U.S.C. 154(b) by 736 days.

(21) Appl. No.: 12/751,824

(22) Filed: Mar. 31, 2010

(65) Prior Publication Data
US 2011/0240550 A1  Oct. 6, 2011

(51) Int. Cl.
| | | |
|---|---|---|
| B01D 71/68 | (2006.01) | |
| B01D 71/80 | (2006.01) | |
| B01D 67/00 | (2006.01) | |
| C08L 81/06 | (2006.01) | |
| B01D 69/10 | (2006.01) | |

(52) U.S. Cl.
CPC ............ *B01D 71/80* (2013.01); *B01D 67/0006* (2013.01); *B01D 71/68* (2013.01); *B01D 67/0011* (2013.01); *C08L 81/06* (2013.01); *B01D 69/10* (2013.01); *B01D 2323/22* (2013.01); *B01D 2325/28* (2013.01); *B01D 2325/36* (2013.01)
USPC ................. 210/500.41; 210/500.35

(58) Field of Classification Search
None
See application file for complete search history.

(56) References Cited

U.S. PATENT DOCUMENTS

| | | | |
|---|---|---|---|
| 4,160,791 A | 7/1979 | Higley et al. | |
| 4,857,196 A | 8/1989 | Manabe et al. | |
| 5,096,637 A | 3/1992 | Dileo et al. | |
| 5,798,437 A | 8/1998 | Hancock et al. | |
| 5,834,583 A | 11/1998 | Hancock et al. | |
| 6,071,406 A | 6/2000 | Tsou | |
| 6,113,785 A | 9/2000 | Miura et al. | |
| 7,108,791 B2 | 9/2006 | Tkacik et al. | |

FOREIGN PATENT DOCUMENTS

JP         2002862 A        1/1990

OTHER PUBLICATIONS

Klaus-Viktor Peinemann, Volker Abetz and Peter F. W. Simon; "Asymmetric superstructure formed in a block copolymer via phase separation"; Published online: Nov. 4, 2007; doi:10.1038/nmat2038; nature materials vol. 6 Dec. 2007 www.nature.com/naturematerials; 5 Pages.

(Continued)

*Primary Examiner* — Krishnan S Menon
(74) *Attorney, Agent, or Firm* — Jenifer E. Haeckl

(57) ABSTRACT

A separation matrix comprises a porous surface layer; and a bulk porous support, wherein both the porous surface layer and the bulk porous support comprising a block copolymer. The block copolymer comprises A-B or A-B-A repeating units, wherein A and B at each occurrence are two different blocks of oligomer, or polymer. A structural unit of block A is derived from one or more atom transfer radical polymerization (ATRP)-active monomer or oligomer and a structural unit of block B is derived from a thermoplastic ATRP-active macro initiator. A poly dispersity index of the block copolymer is at least about 2.

11 Claims, 6 Drawing Sheets

(56) References Cited

OTHER PUBLICATIONS

Lawrence F. Hancock, Stephen M. Fagan and Melissa S. Ziolo ; "Hydrophilic, semipermeable membranes fabricated with poly(ethylene oxide)}polysulfone block copolymer"; Circe Biomedical Inc., 99 Hayden Avenue, Lexington, MA 02421, USA; Received Apr. 29, 1999; accepted Oct. 29, 1999; Corresponding author. Tel.: #1-781-863-8720 x5129; fax:#1-781-861-7936; E-mail address: hancock@circebio.com (L.F. Hancock); 9 Pages.

Guojun Liu and Jianfu Ding ; "Thin Films with Densely, Regularly Packed Nanochannels: Preparation, Characterization, and Applications"; Published on Web Jul. 17, 1999; Received Apr. 2, 1999. Revised Manuscript Received Jun. 8, 1999; Chem. Mater. 1999, 11, 2233-2240; email: klaus-viktor.peinemann@gkss.de.

Klaus-Viktor Peinemann, Matthias Konrad and Volker Abetz ; "Highly ordered membrane structures from block copolymers"; Received Oct. 24, 2005; accepted Mar. 6, 2006; © 2006 Published by Elsevier B.V; Desalination 199 (2006) 124-126.

S.P. Roux, E.P. Jacobs , A.J. Van Reenen, C. Morkel and M. Meincken; "Hydrophilisation of polysulphone ultrafiltration membranes by incorporation of branched PEO-block-PSU copolymers"; Received Jul. 15, 2005; received in revised form Aug. 12, 2005; accepted Sep. 10, 2005; Available online Oct. 17, 2005; Corresponding author. Tel.: +27 21 808 3178; fax: +27 21 808 4967; Journal of Membrane Science 276 (2006) 8-15.

G. D. Fu, E. T. Kang and K.G. Neoh ; "Three-Dimensionally Ordered Porous Membranes Prepared via Self-Assembly and Reverse Micelle Formation from Well-Defined Amphiphilic Block Copolymers"; Received Sep. 24, 2004. In Final Form: Feb. 3, 2005; Published on Web Mar. 15, 2005; Langmuir 2005, 21, 3619-3624.

BLOCK COPOLYMER MEMBRANES AND ASSOCIATED METHODS FOR MAKING THE SAME

FIELD OF INVENTION

The invention generally relates to membranes and methods for making the membranes. The invention specifically relates to block copolymer membranes and associated methods for making the block copolymer membranes.

BACKGROUND

One of the attractive features of block copolymers is the functionality which allows the creation of hybrid macromolecules composed of blocks that are normally immiscible with each other. These macromolecules often self-assemble to form many complex nanoscale morphologies that impart interesting properties and enable a wide range of applications. Macromolecular self-assembly using block copolymers is an active field in polymer research, wherein block copolymers self assemble to form nano-structured materials. One increasingly active application for these ordered structures is in the field of membrane technology.

Block copolymers are most commonly synthesized using special polymerization processes to produce polymers with very narrow polydispersity indices (PDI). While narrow polydispersity is normally desired in block copolymer synthetic protocols, broader polydispersity has a profound impact on phase behavior. Though a wide area of research has been directed at block copolymers, most research has been directed at macromolecular self-assembly utilizing block copolymers of monodisperse materials. Moreover, the capability to fabricate self-assembled structures for membranes with tailored domains has significant implications on scalability and applicability for this technology.

It is desirable that separation matrices are strong, thermally stable, and resistant to oxidative or corrosive elements. Such characteristics are often seen in hydrophobic polymers such as polysulfones or polyethersulfones. Polysulfones are widely used in ultrafiltration membranes for their chemical resistance, desirable mechanical properties, and good thermal stability. However, polysulfones are typically hydrophobic in nature. Hollow fiber and flat sheet ultrafiltration membranes comprising hydrophobic polysulfones are subject to poor wettability and fouling when used in separation and filtration applications.

Rather, a hydrophilic surface is desirable for use in the separation process of aqueous or polar materials. A hydrophilic or wettable surface on a porous polymer promotes uniform filtration and decreases adsorption of material such as protein and other solutes (e.g. fouling). Despite recent advances in the preparation of polysulfone compositions displaying enhanced hydrophilicity, further improvements and refinements in the performance characteristics of membranes comprising polysulfones are required. Thus, alternative separation matrices with both characteristics are needed to provide a broad spectrum of choices for purification of the many new products that are constantly being developed.

For production of therapeutic proteins, a system may contain several distinct filtration steps, including diafiltration, ultrafiltration, and viral clearance. The virus filtration step is an integral component of the bioprocessing stream for the reduction of endogenous virus particles or process-induced viral contamination. Next generation virus filtration membranes are expected to possess high virus log reduction, low fouling (e.g., material hydrophilicity), improved permeability, and robust material construction, which cannot be met by using currently available separation matrices.

BRIEF DESCRIPTION

The compositions, articles, devices and methods of the invention generally relate to novel block copolymer materials and separation matrices made of that material, wherein the separation matrices are able to separate several biological molecules or agents. These separation matrices are useful for virus filtration and can be used in separation devices.

In one embodiment, a separation matrix comprises a porous surface layer; and a bulk porous support, wherein both the porous surface layer and the bulk porous support comprise a self-assembling block copolymer. The block copolymer has a polydispersity index in a range from about 2 to about 5. The block copolymer comprises A-B or A-B-A repeating units, wherein A and B, at each occurrence, are two different blocks comprising an oligomer or a polymer.

In another embodiment, a separation matrix comprises a porous surface layer and a bulk porous support. The porous surface layer and the bulk porous support comprise a self-assembling block copolymer, wherein the block copolymer comprises a structure (I):

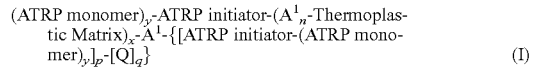

(ATRP monomer)$_y$-ATRP initiator-(A$^1_n$-Thermoplastic Matrix)$_x$-A$^1$-{[ATRP initiator-(ATRP monomer)$_y$]$_p$-[Q]$_q$}   (I)

wherein, the ATRP (atom transfer radical polymerization) monomer comprises one or more acrylates, methacrylates, acrylamides, methacrylamides, styrenics, vinyl pyridines, acrylonitriles, or a combination thereof; the ATRP initiator is a linker between the ATRP monomer repeat units and the Thermoplastic Matrix, and is capable of initiating ATRP; A$^1$ is O, S, —NH, or —NQ, and wherein, Q is an alkyl or an aryl group; x and y are independently at each occurrence integers in a range from about 1 to about 1000; and n, p, and q are 0 or 1, with the proviso that when p is 0, q is 1, and when p is 1, q is 0.

In yet another embodiment, a method of making a separation matrix comprises the steps of providing a dope solvent (or solvents), a non-solvent coagulation bath, and a block copolymer comprising a structure (I):

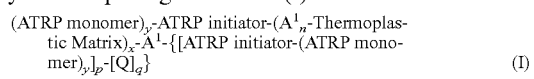

(ATRP monomer)$_y$-ATRP initiator-(A$^1_n$-Thermoplastic Matrix)$_x$-A$^1$-{[ATRP initiator-(ATRP monomer)$_y$]$_p$-[Q]$_q$}   (I)

wherein, the ATRP monomer comprises one or more acrylates, methacrylates, acrylamides, methacrylamides, styrenics, vinyl pyridines, acrylonitriles, or a combination thereof; the ATRP initiator is a linker between the ATRP monomer repeat units and the Thermoplastic Matrix, and is the active species responsible for initiating ATRP; A$^1$ is O, S, —NH, or —NQ, and wherein, Q is an alkyl or an aryl group; x and y are independently at each occurrence integers in a range from about 1 to about 1000; and n, p, and q are 0 or 1, with the proviso that when p is 0, q is 1, and when p is 1, q is 0. In the method, a weight percent of the block copolymer used in a range from about 1 to about 50; and a weight percent of the dope solvent used in a range from about 50 to about 99. The dope solvent is selected from, but not limited to, tetrahydrofuran, dioxolane, acetone, methyl ethyl ketone, methylene chloride, chloroform, N-methylpyrrolidinone, triethylene glycol, diethylene glycol, polyethylene glycol, dimethylsulfoxide, dimethylformamide, or a combination thereof. The block copolymers and dope solvents are mixed to form a dope solution followed by casting the dope solution to promote self assembly on the separation matrix surface. Finally the cast dope solution is immersed in a nonsolvent coagulation bath until the dope solution is phase inverted into a separation matrix.

In some embodiments, a self-assembling block copolymer comprises the structure (II),

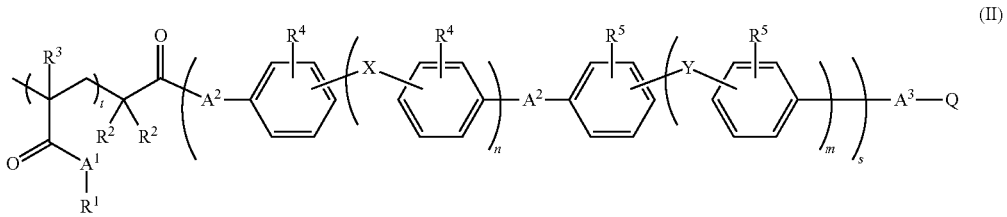

(II)

wherein, $A^1$, $A^2$, $A^3$ are independently at each occurrence, O, S, NH, or NQ, wherein Q is an alkyl, an aryl, or a heterocyclic group, $R^1$ is a hydrogen, a $C_1$-$C_{20}$ alkyl, a $C_1$-$C_{20}$ substituted alkyl, an aryl, a substituted aryl, heterocyclic, or a combination thereof; and $R^2$, $R^3$, $R^4$, $R^5$ are independently at each occurrence a hydrogen, a $C_1$-$C_{20}$ alkyl, a $C_1$-$C_{20}$ substituted alkyl, an aryl, a substituted aryl, a halogen, nitro, amine, cyano, perflourinated aliphatic, heterocyclic, or a combination thereof; X and Y are independently at each occurrence, a bond, $C_1$-$C_{20}$ alkyl, a $C_1$-$C_{20}$ substituted alkyl, an aryl, a substituted aryl, a heteroatom such as S or O, amine, carbonyl, sulfone, phosphinoxide, or a combination thereof, s and t are independently at each occurrence integers in a range from about 1 to about 1000; and m, and n are independently at each occurrence 0 or 1.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1A:
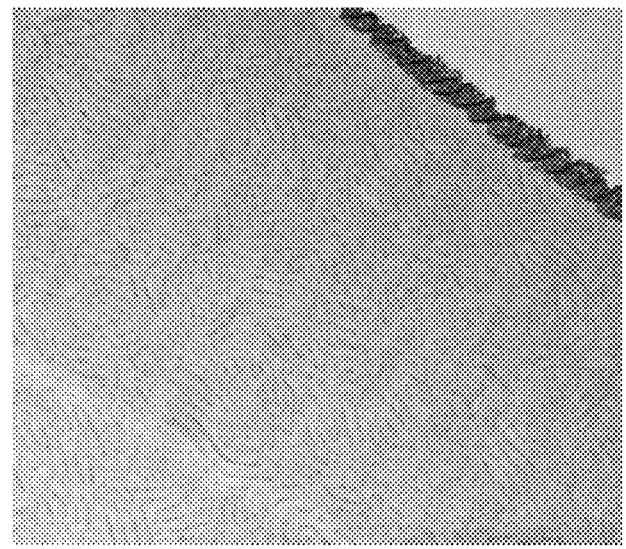
FIGS. 1A and 1B are transmission electron microscopy (TEM) images of embodiments of PHEMA-b-PSU-b-PHEMA thin films used in one or more of the membranes of the invention and made via evaporation of a THF solution.

To more clearly and concisely describe the subject matter of the claimed invention, the following definitions are provided for specific terms, which are used in the following description and the appended claims. Throughout the specification, exemplification of specific terms should be considered as non-limiting examples.

As used herein, "separation matrix" refers to a material useful for separation of virtually any molecule or compound from one or more other distinct molecules or compounds, and the separation matrix is comprised of a porous surface layer and a bulk porous support. More specifically, separation matrix as used herein refers to a porous polymeric matrix comprising a surface layer, which is associated with a support.

As used herein, "surface of a separation matrix" refers to surfaces that comprise both the external surface of the support and the pore surfaces and also the inner surface of the porous layer, which is associated with the bulk porous support.

As used herein, "porous surface layer" refers to a polymeric surface comprising plurality of pores of similar size or various sizes. The porous surface layer may be associated with a polymeric support.

As used herein, "polydispersity index" refers to a measure of the distribution of molecular mass in a given polymer sample. The polydispersity index (PDI) is the calculated value of weight average molecular weight divided by the number average molecular weight. It indicates the distribution of individual molecular masses in a batch of polymers. The PDI has a value equal to or greater than 1, but as the polymer chains approach uniform chain length, the PDI approaches unity (1).

As used herein "phase inversion technique" or "phase inversion" refers to a process of exposing a polymer dope to a controlled environment to induce liquid-liquid de-mixing so as to form a pore structure. Phase inversion is a typical step in the formation of microporous membrane. Examples of phase inversion include, but are not limited to, non-solvent induced phase separation (NIPS), which is contacting the polymer dope coating to a non-solvent system and thermally induced phase inversion, which is exposing a dope solution to a vapor interface and evaporating the solvent from the dope coating.

As used herein "Atom Transfer Radical Polymerization" (ATRP) refers to a living polymerization or a controlled radical polymerization (CRP). ATRP is a highly versatile controlled radical polymerization that can be used to design and synthesize novel block copolymers that incorporate a broad spectrum of radically polymerizable monomers. In the presence of a transition metal based catalyst, the polymer may grow to form a homogeneous polymer chain, which leads to low polydispersity. This catalyst provides an equilibrium between active (or propagating) polymer and an inactive form of the polymer; known as the dormant form. Since the dormant state of the polymer is vastly preferred in this equilibrium, side reactions are suppressed. This equilibrium in turn lowers the concentration of propagating radicals, thereby suppressing unintentional termination and controlling molecular weights. ATRP reactions are very robust in that they are tolerant of many functional groups like allyl, amino, epoxy, hydroxyl and vinyl groups present in either the monomer or the initiator. ATRP methods are also advantageous due to the ease of preparation, commercially available and inexpensive catalysts (copper complexes), pyridine based ligands and initiators (alkyl halides).

As used herein "structural unit" in a polymer refers to a building block of a polymer chain, and is related to the repeat unit. The structural unit is the result of polymerization of a monomer or oligomer into a long chain. The term "hydrophilic unit" refers to the structural unit which is hydrophilic in nature and the term "hydrophobic unit" refers to the structural unit which is hydrophobic in nature.

As used herein an "alkyl" group is a hydrocarbon; typically an alkyl is a part of a larger molecule. In a structural formula, an alkyl group is represented with an R. Usually, alkyl groups resemble hydrocarbons, but with one less hydrogen atom. The smallest alkyl group is methyl. Usually alkyl groups are attached to other atoms or groups of atoms. Free alkyls occur as neutral compounds, as anions, or as cations. The neutral alkyls are called free radicals. The cations are called carbocations. The anions are called carbanions. An aliphatic radical comprises a wide range of functional groups such as alkyl groups. For example, the 4-methylpent-1-yl radical is a $C_6$ aliphatic radical comprising a methyl group, the methyl group being a functional group which is an alkyl group. If one or more atoms or functional groups are substituted by another, then the resultant alkyl is called a substituted alkyl. For example, the hydroxyl group of methanol is substituted by a halide, such as, iodide to form methyl iodide, which is a substituted alkyl. For another example, alkyl can be a haloalkyl. The haloalkyl group which comprises one or more halogen atoms which may be the same or different. Halogen atoms include, for example; fluorine, chlorine, bromine, and iodine. Alkyl group comprising one or more halogen atoms include the alkyl halides such as, trifluoromethyl, bromodifluoromethyl, chlorodifluoromethyl, chloromethyl, difluorovinyl, trichloromethyl, bromodichloromethyl, bromoethyl, and the like.

As used herein "aryl" refers to any functional group or substituent derived from a simple aromatic ring, may it be phenyl, thiophene, or indolyl. "Aryl" is used for the sake of abbreviation or generalization. A simple aryl group is phenyl, $C_6H_5$; it is derived from benzene. The tolyl group, $CH_3C_6H_4$, is derived from toluene(methylbenzene). The xylyl group, $(CH_3)_2C_6H_3$, is derived from xylene (dimethylbenzene). Aryl is an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, "aryl" includes but is not limited to phenyl, pyridyl, furanyl, thienyl, naphthyl, phenylene, and biphenyl radicals. As noted, the aryl group contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like.

As used herein, "virus log reduction" refers to removal efficiency of a filter that is determined from the results of the challenge test and expressed in terms of log reduction values using the following equation:

$$LRV = LOG_{10}(C_f) - LOG_{10}(C_p)$$

Wherein, LRV=log reduction value demonstrated during challenge testing; $C_f$=the feed concentration measured during the challenge test; and $C_p$=the filtrate concentration measured during the challenge test. In applying this equation, the same units must be used for the feed and filtrate concentrations. If the challenge particulate is not detected in the filtrate, then the term $C_p$ must be set equal to the detection limit.

One or more embodiments comprise a separation matrix derived from a block copolymer. The separation matrix comprises a porous surface layer, and a bulk porous support, wherein both the porous surface layer and the bulk porous support comprise a self-assembling block copolymer.

The porous surface layer of the separation matrix comprises a plurality of pores. The pores have diameter in a range from about 5 nm to about 5 micron, which is an expected range of pore-diameter for ultrafiltration membranes. In various embodiments, the pores have diameters in a range from about 20 nm to about 100 nm, which is an expected range of pore-diameter for virus filtration membrane. For example, in one embodiment, the surface layer possesses pores with average diameters of about 20 nm, which is an expected range of pore-diameter of a membrane for filtration of parvovirus. The matrix comprises a pore-size distribution, which is suitable for viral clearance with virus log reduction values greater than 4 (LRV>4).

The pores may be formed on the surface layer by a phase inversion technique. In one or more embodiments, the phase-inverted layer has open, hydrophilic pores to allow minimum flow resistance while maintaining advantageous mechanical strength. By controlling the self-assembly of block copolymers in the matrix fabrication process, the pore density may be increased and the surface hydrophilicity may be improved, which results in high permeability. Increase in pore density and surface hydrophilicity also reduces matrix fouling.

In one example of the methods, a platform of block copolymers is developed by an assortment of hydrophilic and hydrophobic blocks. The block copolymers comprise mechanically strong hydrophobic blocks (such as polysulfone (PSU) and polyether sulfone (PES)) and hydrophilic pore-forming blocks. The hydrophilic and hydrophobic blocks can phase separate to give spherical or cylindrical morphologies depending on the polymer composition. The block copolymer has a PDI, which may vary in a range from about 2 to 5. In a specific embodiment, the PDI of the block copolymer is about 2.5. The block copolymers comprise the blocks having repeat units in a range from about 5 to 400. The molecular weight of the block copolymer may vary in a range from about 15000 to 250000 g/mol.

The block copolymers comprise A-B or A-B-A repeating units, wherein A and B at each occurrence are two different blocks of oligomer, or polymer. The block A of the copolymer is a hydrophilic pore-forming unit. A structural unit of block A is derived from one or more ATRP-active monomer or oligomer. The ATRP-active monomers or oligomers comprise one or more acrylate, methacrylate, acrylamide, methacrylamide, styrene, acrylonitrile, or a combination thereof. In a specific embodiment, the ATRP-active monomers or oligomers comprise 2-hydroxyethyl methacrylate (HEMA). Hydrophilic moieties, such as HEMA and polyethylene glycol methacrylate (PEGMA) were polymerized from the ATRP-active macro initiator monomer.

The block B of the copolymer is a hydrophobic thermoplastic unit. A structural unit of block B is derived from a thermoplastic ATRP-active macro initiator. Engineering thermoplastics are robust materials that exhibit the necessary strength and mechanical properties to excel in membrane applications. The thermoplastic ATRP-active macro initiator comprises polysulfone, polyethersulfone, polyketones, polyarylenes, polyimides, or a combination thereof. In a specific embodiment, the thermoplastic ATRP-active macro initiator comprises polysulfone. The block copolymers are synthesized from robust engineering thermoplastics, PSU and PES. PSU and PES were made via polycondensation and end-capped with an ATRP-active endgroup. Polysulfones may be endcapped with ATRP-active initiators and selected monomers, such as HEMA and PEGMA may be polymerized from the ATRP-active polysulfone macroinitiator to yield AB or ABA type block copolymers.

The block copolymer comprises a structure (I):

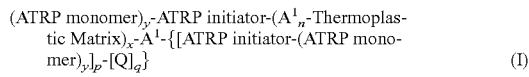

wherein, an ATRP monomer is acrylates, methacrylates, acrylamides, methacrylamides, styrenics, vinyl pyridines, acrylonitriles, or a combination thereof; ATRP initiator is a linker between the ATRP monomer repeat units and the Thermoplastic Matrix and is capable of initiating ATRP; $A^1$ is O, S, NH, or NQ. Q is an alkyl or an aryl group, x and y are independently, at each occurence, integers in a range from about 1 to about 1000, and n, p, and q are 0 or 1, with the proviso that when p is 0, q is 1, and when p is 1, q is 0. In some embodiments, while n is 0, then O, S, —NH, —NQ are absent, and then ATRP initiator is directly attached to thermoplastic matrix. In an alternative embodiment, while, n is 1, then ATRP initiator is attached to the 'Thermoplastic Matrix' through $A^1$, and $A^1$ can be O, S, NH, or NQ. As used herein the term "attached" in specification, means presence of a covalent, or ionic, or H-bond between two same or different atoms.

In structure (I), (ATRP monomer)$_y$ may be configured as block A and ($A^1{}_n$-Thermoplastic Matrix)$_x$ may be configured as block B. The ATRP initiator is a linker between ATRP monomer repeat units and the Thermoplastic Matrix in the block copolymers and was the active species responsible for initiating ATRP. In one embodiment, while p is 0, and q is 1, the block copolymer comprises A-B type repeat units, where Q is directly bonded to $A^1$. In an alternative embodiment, while p is 1, and q is 0, then block copolymer comprises A-B-A type repeat units. In A-B-A type units, ATRP monomer is attached to ATRP initiator and the initiator is further connected to the 'Thermoplastic Matrix' through $A^1$, and $A^1$ can be O, S, NH, or NQ.

In one embodiment, the block copolymers comprise A-B repeating units. The block copolymers with A-B repeating units may comprise structure (II),

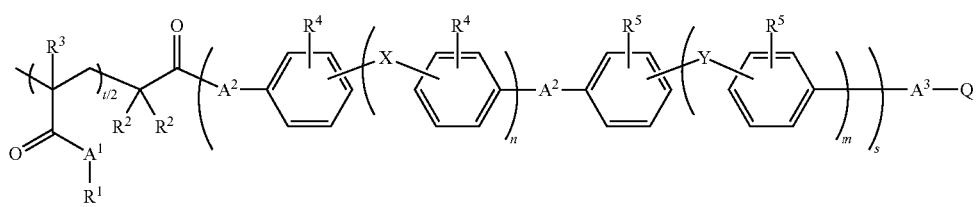

wherein, $A^1$, $A^2$, $A^3$ are independently at each occurrence O, S, NH, or NQ, wherein Q is an alkyl, an aryl, or a heterocyclic group, $R^1$ is a hydrogen, a $C_1$-$C_{20}$ alkyl, a $C_1$-$C_{20}$ substituted alkyl, an aryl, a substituted aryl, heterocyclic, or a combination thereof; and $R^2$, $R^3$, $R^4$, $R^5$ are independently at each occurrence a hydrogen, a $C_1$-$C_{20}$ alkyl, a $C_1$-$C_{20}$ substituted alkyl, an aryl, a substituted aryl, a halogen, nitro, amine, cyano, perflourinated aliphatic, heterocyclic, or a combination thereof; X and Y are independently at each occurrence, a bond, a $C_1$-$C_{20}$ alkyl, a $C_1$-$C_{20}$ substituted alkyl, an aryl, a substituted aryl, a heteroatom, or a combination thereof, s and t are independently at each occurrence integers in a range from about 1 to about 1000; and m, and n are independently at each occurrence 0 or 1. In one embodiment, the heteroatoms are S, O, amine, carbonyl, sulfone, phosphinoxide, or a combination thereof.

The examples of A-B type block copolymers may include, but are not limited to:

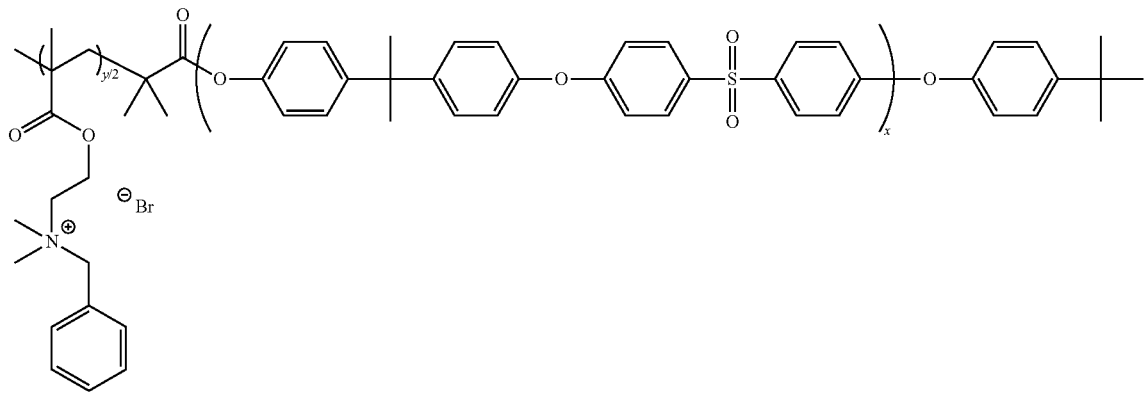

P(DMAEMA-BzBr)-b-PSU

-continued
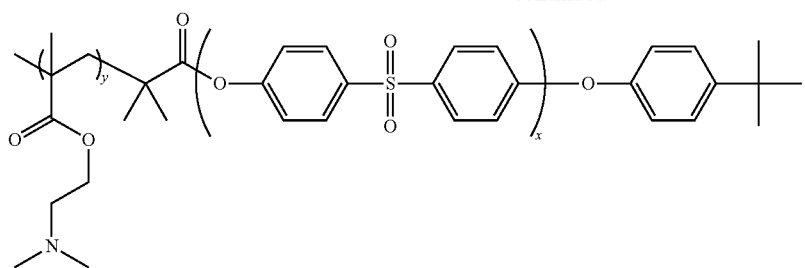
P(DMAEMA)-b-PES
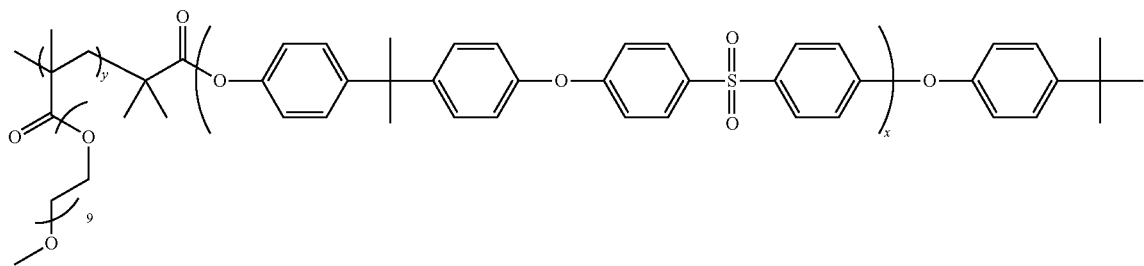
P(PEGMA)-b-PSU
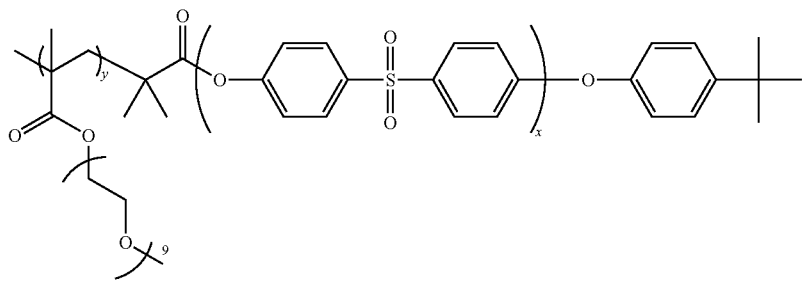
P(PEGMA)-b-PES
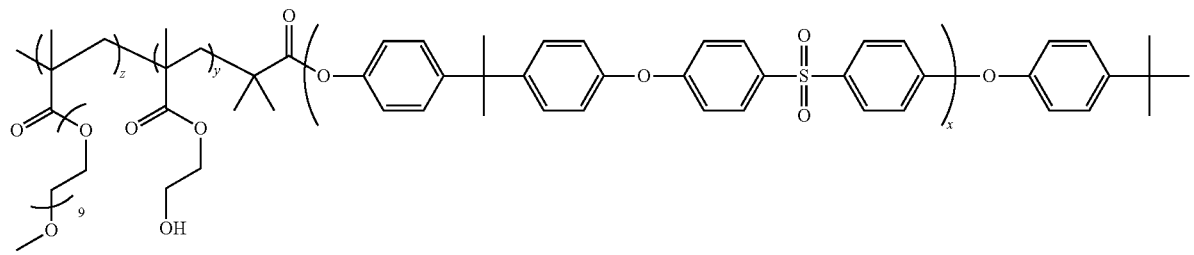
P(PEGMA)/PHEMA-b-PSU
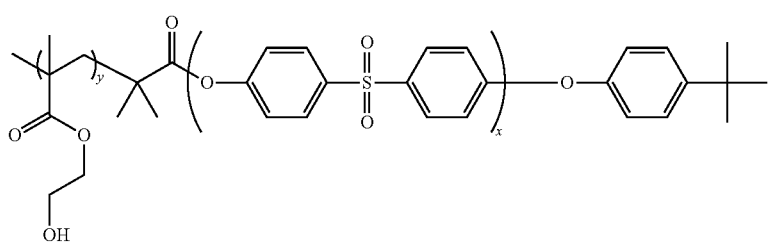
PHEMA-b-PES

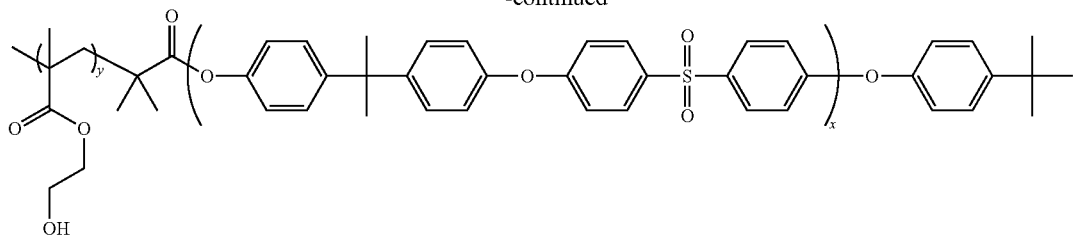

PHEMA-b-PSU wherein, "-b-" represents "-block-" and therefore the polymers represent block copolymers.

In another embodiment, the block copolymers comprise A-B-A repeating units. The block copolymers with A-B-A repeating units may comprise structure (III),

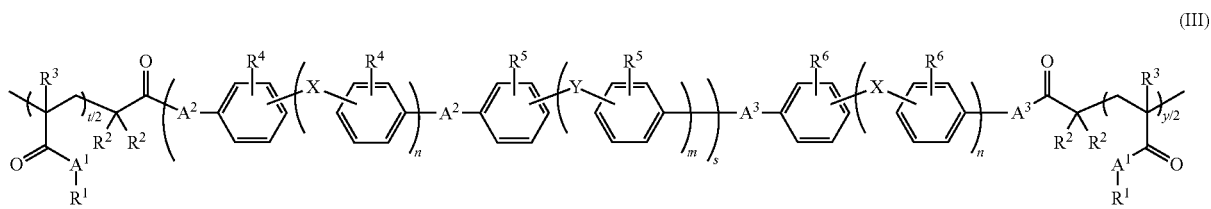

(III)

wherein, $A^1$, $A^2$, $A^3$ are independently at each occurrence, O, S, NH, or NQ, wherein Q is an alkyl, an aryl, or a heterocyclic group. $R^1$ is a hydrogen, a $C_1$-$C_{20}$ alkyl, a $C_1$-$C_{20}$ substituted alkyl, an aryl, a substituted aryl, heterocyclic, or a combination thereof; and $R^2$, $R^3$, $R^4$, $R^5$ and $R^6$ are independently at each occurrence a hydrogen, a $C_1$-$C_{20}$ alkyl, a $C_1$-$C_{20}$ substituted alkyl, an aryl, a substituted aryl, a halogen, nitro, amine, cyano, perflourinated aliphatic, heterocyclic, or a combination thereof. X and Y are independently at each occurrence, a bond, a $C_1$-$C_{20}$ alkyl, a $C_1$-$C_{20}$ substituted alkyl, an aryl, a substituted aryl, a heteroatom, or a combination thereof, and s and t are independently at each occurrence integers in a range from about 1 to about 1000; and m, and n are independently at each occurrence 0 or 1. In one embodiment, the heteroatoms are S, O, amine, carbonyl, sulfone, phosphinoxide, or a combination thereof. The self-assembling block copolymer comprising A-B-A type repeat units has a polydispersity index in a range from about 2 to about 5.

The examples of A-B-A type block copolymers may include, but are not limited to:

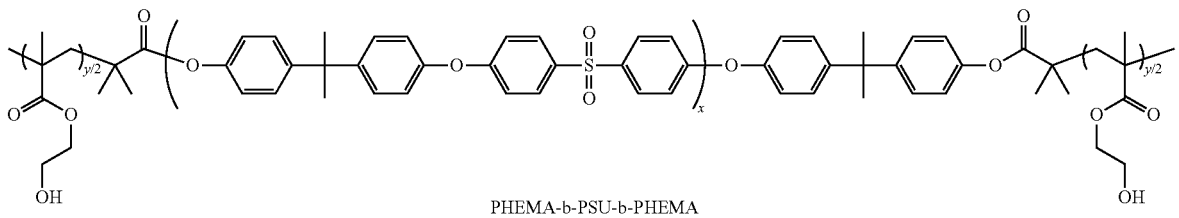

PHEMA-b-PSU-b-PHEMA

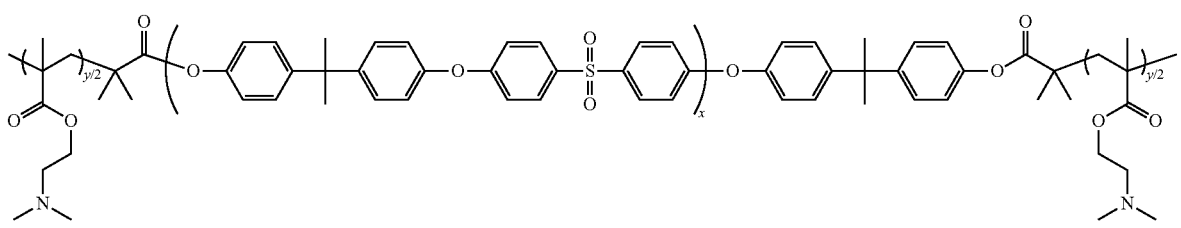

P(DMAEMA)-b-PSU-b-(DMAEMA)

-continued

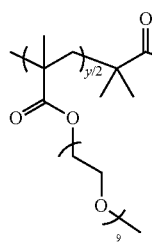 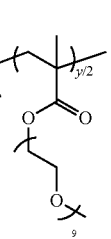

P(PEGMA)-b-PSU-b-(PEGMA)

wherein, "-b-" represents "-block-" and therefore the polymers represent block copolymers.

The separation matrix may be made in the form of a membrane, a web, a filter, a fiber, or a mesh. In one embodiment, the separation matrix is an ultrafiltration membrane, such as, for example, a virus filtration membrane. In a specific, non-limiting example, the virus filtration membrane is capable of separating parvovirus present in a biological sample. The separation matrix may be dried prior to or after use.

An embodiment of a device, of the invention, for separating viruses from a biological sample, comprises the separation matrix. The device itself may comprise a chromatographic chamber, a tubular column, a monolith; a filter or a membrane; a capillary; a microfluidic chip, a pleated cartridge or capsule or cassette, a spiral, a hollow fiber, a syringe filter, a manifold, or a multi-well plate.

The device, in some embodiments, may further comprise an additional separation membrane. The additional membrane may be used to polish the biological sample, for example, by selectively removing certain compounds from the sample. In some embodiments, the additional polishing step has a capacity of removing trace impurities such as host cell proteins, nucleic acid, endotoxin, viruses, or aggregated proteins or peptides.

The separation device may be attached to a display device wherein details of the flow rate, time, purity or salt concentration can be displayed. The separation device, for example, a porous separation matrix, may be incorporated into a separation system comprising a bulk porous support comprising a polymeric resin, a controller, a computer, a display device, a liquid (mobile phase) handling system, a flow-through collection system. The separation system may be automated to perform one or more of its function with or without an operator intervention.

In some embodiments, the separation device may be a sterile disposable device. An advantage of using disposable membrane devices for purification of therapeutic compounds such as antibodies is that it enables avoiding cross-contamination between two different processes.

In some embodiments, the separation device may be reusable. In such cases, the matrix should be washed several times with eluent after passing the mobile phase through the matrix. The flow through of the final eluent may be tested to make sure that there are no molecules of interest, such as, proteins or peptides, viruses or other compounds present in the eluent. The matrix may then be equilibrated using a suitable buffer for further use.

In some embodiments, the device is further sterilized by suitable methods prior to use. The device may be resistant to autoclaving conditions of high temperature and/or high pressure. Sterilization may be carried out by heat treatment (such as autoclaving or exposing the internal matrix to saturated steam); by radiation in sufficient dose up to and including 45 kGy; or by using any other conventional methods for sterilization.

For small-scale purification, any of the referenced device formats in small area configurations may be used to improve purity as a polishing unit operation. For the step of polishing by removing impurities (or molecule of interest, e.g., viruses) from a therapeutic or diagnostic biologic molecule, such as antibody, small tubular column or syringe filters may be useful. One or more inlet and outlet may be attached to the membrane device to maintain inward and outward flow of the mobile phase. The device may be in the form of a single layer or multi-layer format of the separation matrix. The device may be connected to a pump or a pressure vessel attached to the inlet of the device to maintain a flow rate through the separation matrix.

The device may be used as a second, third or even fourth chromatography steps in a cleaning protocol, such as an intermediate purification or polishing step. Thus, the mobile phase may comprise an antibody-containing biological sample applied to the present separation matrix.

An example of the method of making a separation matrix comprises providing a dope solvent, a non-solvent coagulation bath, and block copolymers comprising structure (I). The block copolymers are mixing in the dope solvent to form a dope solution by optimizing around the unique solubility parameters of polymer. Then the dope solution containing the block copolymers is casted on a support plate. The dope solution is then immersed in a coagulation bath so that the remainder of the cast film is phase inverted into a microporous matrix or membrane. At the end of the membrane process, a composite structure with a surface layer and a bulk porous support layer is formed.

The extent of phase separation of a block copolymer is dictated by a dimensionless parameter, $\chi N$, wherein $\chi$ is the Flory-Huggins interaction parameter, which signifies the incompatibility of the monomers; and N is the degree of polymerization, which is related to the entropic penalty associated with chain stretching upon microphase separation. If either $\chi$ or N is sufficiently high, the enthalpic (demixing) effect dominates, leading to formation of ordered phases with appropriate compositions. The transition from a homogeneous melt of polymer chains to ordered phases is called order-disorder transition (ODT). The type of ordered phase that is formed depends further on the volume (or weight) fraction of each block, $\phi$, which determines the curvature of the interface between blocks. Depending on the $\chi N$ and $\phi$, various microphase-separated structures can be formed, such as isolated spheres, close-packed spheres, body-centered cubic packed spheres, hexagonally packed cylinders, bi-continuous cubic double gyroid, and lamellae. For virus filtration applications, the cylindrical region may be the most amenable for well-defined and continuous pores.

In one embodiment of the matrix, the block copolymer is used in a range from about 1 to about 50 weight percent and the dope solvent is used in a range from about 50 to about 99 weight percent. The dope solvent is selected from, but not limited to, tetrahydrofuran, dioxolane, acetone, methyl ethyl ketone, methylene chloride, chloroform, N-methylpyrrolidinone, triethylene glycol, diethylene glycol, polyethylene glycol, dimethylsulfoxide, dimethylformamide, MEK, dioxane, DMSO, or a combination thereof.

In one embodiment for making the separation matrix, the weight percent of the block copolymer used in dope solution in a range from about 5 to about 35. The dope solution further comprises porogen in a range from about 0.5 to about 5 weight percent. The dope solution is cast and solvent evaporation promotes surface self assembly domains comprising pores, which are dispersed on the surface of the separation matrix. The dope solution is then immersed in a nonsolvent coagulation bath until the remainder of the casting solution is phase inverted into a separation matrix.

The casting solution comprises blends of thermoplastic polymers, wherein thermoplastic polymers comprise polysulfone, polyethersulfone, polyketones, polyetherketones, polyimides, or the combination thereof.

The separation matrix may be used as a virus filtration membrane. For example, high performance ultrafiltration membrane filters are utilized to remove endogenous or adventitious virus particles that originate from starting cells or are brought in during bioprocessing from the drug products. The virus membrane filters are expected to provide both high log reduction value for virus (LRV>4), sufficient monoclonal antibody (mAbs) recovery (>98%), and substantial protein capacities (>200 L/m$^2$). In addition, the membrane filters are also expected to demonstrate high permeability (>10 LMH/psi).

A sample that is passed through the device may be a supernatant obtained from a cell extract. In some embodiments, prior to contacting the sample with the separation matrix, one or more pre-purification steps may be performed. The one or more pre-purification steps may include, but are not limited to, mechanical filtration, centrifugation, ultracentrifugation, gel filtration, ion exchange chromatography, affinity chromatography, or electrophoresis.

In some embodiments, the sample to be purified, is a biological sample containing antibodies, and may comprise one or more compounds apart from the molecules of interest. The "molecules of interest" as referred herein are any molecules that are to be separated from a sample containing biological compounds. The terms "molecules of interest" and "compounds of interest" are interchangeably used in the specification. For example, the molecules of interest may be viruses that need to be separated from a mixture containing antibodies and other materials. For example, molecules of interest may include, but are not limited to, proteins, peptides, amino acids, nucleic acids (e.g., DNA, RNA), endotoxins, viruses, and antibodies. The compounds present in the biological sample may bind to the separation matrix. The separation matrix may interact with one or more molecules of interest present in the sample via electrostatic interactions employing the charged sites (e.g., a negative charge) present on the compounds. For example, biological compounds or biological agents, other than molecules of interest, will not bind to the matrix, and are then passed through the matrix in a flow-through stream.

A biological agent of interest such as viruses may be separated from one or more other unwanted compounds or agents present in a biological sample by contacting a mobile phase comprising said biological sample with the separation matrix. In a specific embodiment, a method of purifying biological agents, such as antibody, may be carried out using the principles of liquid chromatography (i.e., by passing a mobile phase over device comprising the separation matrix according to the invention).

The separation matrix is useful to separate any monoclonal or polyclonal antibody, such as antibodies originating from mammalian hosts, e.g. mice, rodents, primates and humans, or antibodies originating from hybridomas. In one embodiment, the antibodies are collected from human or humanized antibodies. The antibodies may be of any class, i.e. selected from the group that consists of IgA, IgD, IgE, IgG, or IgM. In one embodiment, the antibodies are capable of binding to Protein A, or Fc-containing antibody fragments or fusion proteins. In a specific embodiment, the antibodies are immunoglobulin G (IgG), such as IgG1. In the present context, it is to be understood that the term "antibodies" also includes antibody fragments and any fusion protein that comprises an antibody or an antibody fragment. Thus, the present invention also encompasses the separation of fragments of any one of the above-mentioned antibodies as well as fusion proteins comprising such antibodies. In one embodiment, the antibodies are monoclonal antibodies. In a specific embodiment, the antibodies are humanized antibodies.

The antibodies that need to be separated from unwanted other compounds may originate from any well known source, such as cells cultured at a surface, or from batch-wise or continuous cell culture in fermentation tanks or vessels. The sample containing the antibody may be a liquid, a suspension, or a semi-solid. In a specific embodiment, the sample is a liquid sample. The sample may comprise a crude cell extract or maybe a partially purified cell extract. The sample may be collected from a patient body. In one embodiment, the biological sample may be a supernatant obtained from cell fermentation.

The method of purifying biological molecules may be adapted to adsorb a specific compound, advantageously by control of the pH and/or conductivity. In one embodiment, the present matrix is used to purify antibodies by separating viruses, in an isoelectronic point (pI) in the range of 6-9, specifically in the range of 7-8. In a specific embodiment, the pI of the purified antibodies is about 9. For one example, in the separation of antibodies, different classes of antibodies have different charges and charge distribution patterns. The combination of charge distribution pattern and the purpose of the separation will decide whether antibodies are more preferable to adsorb or to let them pass through the device without being adsorbed.

EXAMPLES

Materials used for experimentations: Triethylamine, 4,4'-difluorodiphenylsulfone, 2-bromoisobutyryl bromide, 2-hydroxyethylmethacrylate (HEMA), polyethylene glycol methyl ether methacrylate (PEGMA) with an average molecular weight of 475 g/mol, N,N-dimethylaminoethylmethacrylate (DMAEMA), copper(I) chloride, copper(II) chloride, 2,2'-bipyridine, and N,N,N',N',N''-pentamethyldiethylenetriamine (PMDETA) were purchased from Aldrich (USA). Bisphenol A was purchased from former GE Plastics and from Japan in Chiba (Japan). 4,4'-dichlorodiphenylsulfone was purchased from Sloss Industries (Birmingham, Ala., US), and N-methylpyrrolidinone, N,N-dimethylacetamide, chloroform, methanol, acetone, tetrahydrofuran, and methylene chloride were purchased from Fisher Chemicals (USA). All chemicals were used as received, unless otherwise mentioned. 2-Hydroxyethylmethacrylate (HEMA) and N,N-dimethylaminoethylmethacrylate (DMAEMA) were distilled before use. NMR spectra were recorded on a Bruker Avance 400 (1H, 400 MHz) spectrometer and referenced by a residual solvent shifts. Molecular weights are reported as number average (MO or weight average ($M_w$) molecular weight and were determined by gel permeation chromatography analysis on a Perkin Elmer Series 200 instrument equipped with UV detector. Polystyrene molecular weight standards were used to construct a broad standard calibration curve against which polymer molecular weights were determined. The temperature of the gel permeation column (Polymer Laboratories PLgel 5 μm MIXED-C, 300×7.5 mm) was 40° C. for $CHCl_3$ mobile phase or 70° C. for NMP mobile phase. Polymer thermal analysis was performed on a Perkin Elmer DSC7 equipped with a TACT/DX thermal analyzer and processed using Pyris Software.

Example 1

Synthesis and Characterization of ABA Block Copolymers

PHEMA-b-PSU-b-PHEMA and P(PEGMA)-b-PSU-b-P(PEGMA) were synthesized and characterized using standard techniques. The above mentioned ABA-type block copolymers were synthesized from HEMA and an ATRP-active PSU, to form PHEMA-b-PSU-b-PHEMA, and polyethylene glycol methacrylate (PEGMA) and an ATRP-active PSU to form P(PEGMA)-b-PSU-b-P(PEGMA) (Scheme 1). P(DMAEMA)-b-PSU-b-P(DMAEMA) was also synthesized in an analogous fashion. Both P(PEGMA)-b-PSU-b-P(PEGMA) and PHEMA-b-PSU-b-PHEMA showed favorable membrane properties such as robust mechanical properties and hydrophilicity. The drastic difference between the PSU and PHEMA block solubility parameters promote the phase separation and improve the pore formation on the membrane surface during phase inversion. In a specific embodiment, the membrane was prepared with the block copolymer PHEMA-b-PSU-b-PHEMA.

Scheme 1 for synthesis of ABA type block copolymer is shown below.

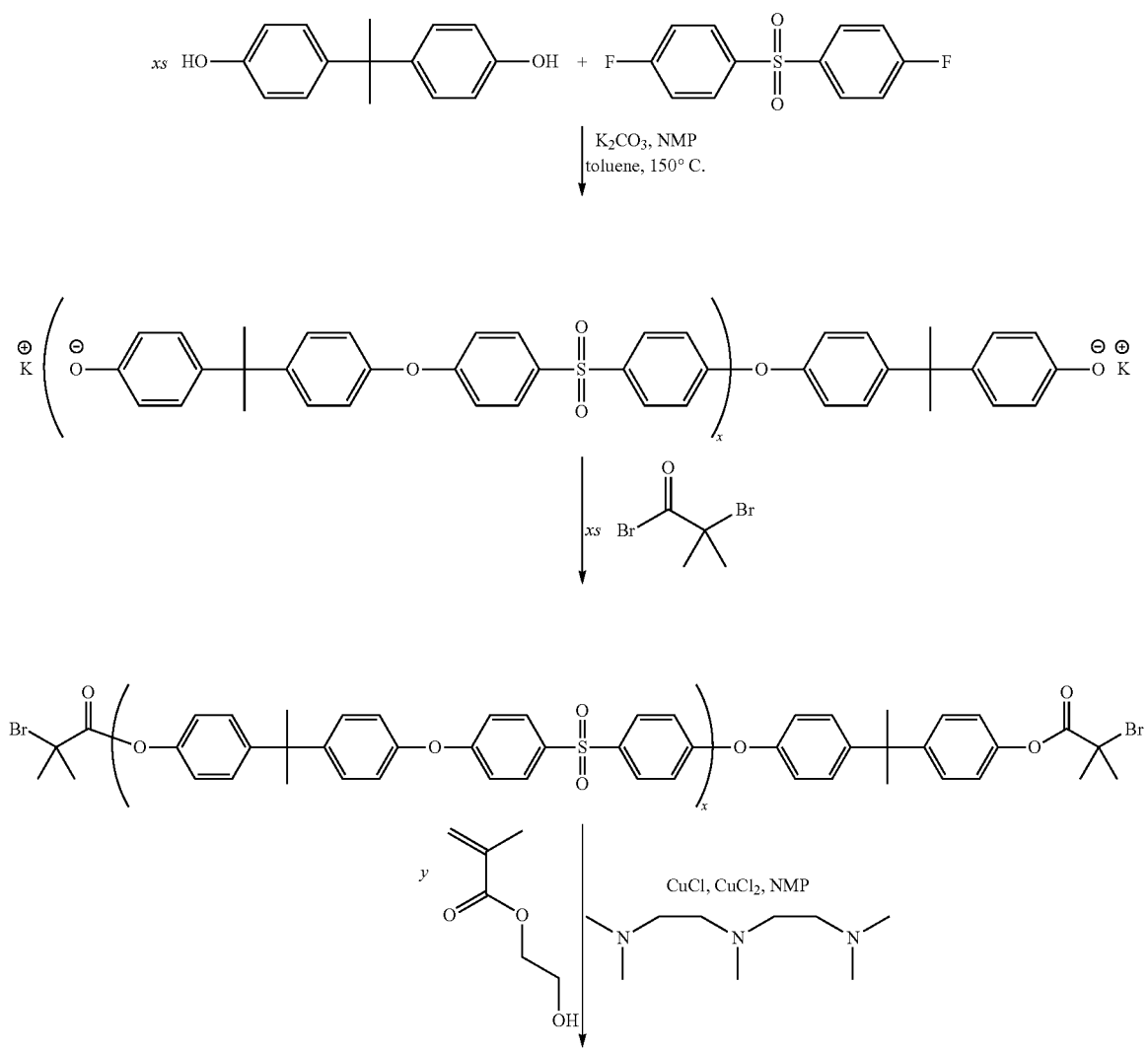

-continued

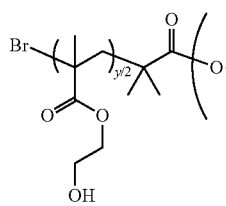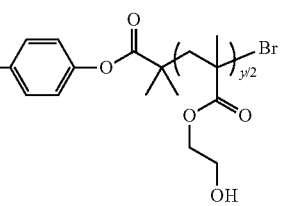

PHEMA-b-PSU-v-PHEMA

To synthesize PHEMA-b-PSU-b-PHEMA, the following methodology was employed, which is illustrated in Scheme 1. The reaction stoichiometry was controlled by addition of a slight excess of bisphenol-A (BPA) to yield a telechelic, hydroxide-capped PSU, and the reaction was then terminated with 2-bromoisobutyryl bromide (BiBB) to produce Br-PSU-Br (as shown in Scheme 1). The isobutyryl bromide end group is a highly reactive initiator for ATRP.

A copper-mediated controlled radical polymerization was performed that typically generates polymers with low polydispersity. These ATRP-active polymers were utilized to build a library of block copolymers with varying compositions and molecular weights. Br-PSU$_{50}$-Br, where 50 denotes the number of polysulfone repeating units, was utilized as the ATRP initiator. The compositions are shown in Table 1. HEMA or PEGMA were polymerized with Br-PSU$_{50}$-Br via ATRP in the presence of CuCl, CuCl$_2$, N,N,N',N',N''-pentamethyldiethylenetriamine (PMDETA), and N-methylpyrrolidinone (NMP), to give the target block copolymers of PHEMA-b-PSU-b-PHEMA or P(PEGMA)-b-PSU-b-P(PEGMA), respectively. The solvents were degassed by freeze-pump-thaw cycles, and also by simple nitrogen sparging of the NMP solvent. $^1$H NMR spectroscopy of P(PEGMA)-b-PSU-b-P(PEGMA) revealed the block length of approximately 12 PEGMA repeat units, which were grown from the PSU block and corresponds to a PEGMA weight fraction ($\phi_y$) of 0.14. Furthermore, gas phase chromatography (GPC) (NMP as eluent) measurements were showed an increase of number average molecular weight (Mn) from about 23,000 g/mol to about 36,000 g/mol. PDIs for both Br-PSU-Br and the resultant block copolymers were about 2.0 or higher.

Scale-Up of End-Capped Polysulfone Macroinitiator Br-PSU$_{50}$-Br

A 50-L glass-lined reactor was first charged with 9.0 L of NMP at room temperature (RT). 1.00 kg Bisphenol-A (BPA) (4.38 mol, MW=228.29 g/mol) and 1.00 kg K$_2$CO$_3$ (7.23 mol) were then added to the reactor. The mixture was stirred slowly to ensure complete dissolution of the Bisphenol-A, and then 2.5 L toluene was charged to the reactor equipped with mechanical stirrer, Dean Stark trap, and nitrogen purge capabilities. The mixture was then heated to 125° C. (thermocouple temperature in reactor) with nitrogen purge at about 1 scfh (standard cubic feet per hour), while stirring at 200 rpm. At 125° C., water was removed azeotropically over the course of 3 hours with occasional addition of toluene (2×1 L).

When all of the water was removed azeotropically, then the reaction was cooled overnight to RT. 1.235 kg 4,4'-Dichlorodiphenylsulfone (DCDPS) (4.301 mol, MW=287.16 g/mol) was then added to the reaction mixture. Toluene (2×1 L) was further added to remove additional water. The mixture was stirred at 170° C. for about 8 hours, at which point a highly viscous solution was formed. GPC in NMP showed a weight average molecular weight (M$_w$) of the product is about 41 k and a number average molecular weight (MO is of about 26 k. The viscous mixture was diluted with 9 L NMP, cooled to RT, and allowed to stir overnight. 3 L light brown polymer solution was added to 30 L of excess water to precipitate the polymer in a Henschel Homogenizer. The polymer was collected via centrifugation and successively washed with water, and then methanol. The polymer was then dried in vacuum to remove residual solvent.

The dried polymer was then dissolved in 12 L methylene chloride. 45.0 g triethylamine (0.445 mol) and 100 g of 2-bromoisobutyryl bromide (0.435 mol) were added slowly and sequentially. The reaction mixture was stirred overnight at RT, and the 6 L light brown polymer solution was then precipitated into 30 L methanol using a Henschel Homogenizer. The polymer was soaked in water for 2 days to remove any residual salts, filtered via centrifugation, and then washed with methanol. 1.75 kg (91% yield) Br-PSU$_{50}$-Br was produced which was further dried in vacuum at 50° C. overnight to remove residual solvents. GPC (UV detector) with CHCl$_3$ showed a final M$_w$ of 46,000 and M$_n$ of 27,500 g/mol.

Synthesis of PSU Based ABA Block Copolymers:

PHEMA$_8$-b-PSU$_{50}$-b-PHEMA$_8$ (Sample I)—NMP (400 mL) was added to a three-necked round bottom flask equipped with a mechanical stirrer. With stirring at 200 rpm, the solvent was degassed by sparging with nitrogen for one hour. 100 g of Br-PSU$_{50}$-Br (8.81 mmol of Br initiator) was then added and dissolved at 70° C. The solution was cooled to 40° C., at which point, 3.75 mL PMDETA (17.9 mmol), 11.5 mL HEMA (94.8 mmol), 0.526 g copper (I) chloride (5.31 mmol), and 0.294 g copper (II) chloride (2.19 mmol) were added sequentially under a nitrogen purge. The solution turned dark green color over the course of 30 minutes, and the reaction was stirred vigorously (400 rpm) for 16 hours at 40° C. The reaction was diluted with tetrahydrofuran (400 mL) and basic alumina (~50 g) was added to bind copper ions. The mixture was filtered over a bed of Celite and alumina. The tetrahydrofuran was removed using rotovap, and the light brown colored 250 g polymer solution was precipitated into 2 L water. The polymer was filtered, washed with water, followed by another wash with methanol. The polymer was re-dissolved in 750 mL CH$_2$Cl$_2$, and the resultant 250 g polymer solution was precipitated into 1.5 L methanol using a blender, filtered, and then washed with methanol to remove excess NMP. PHEMA-b-PSU$_{50}$-b-PHEMA, with repeat units of 8-50-8, was then dried in vacuum (vacuo) at 50° C. for overnight to remove residual solvent.

PHEMA$_{14}$-b-PSU$_{50}$-b-PHEMA$_{14}$ (Sample II)—2.00 g of Br-PSU$_{50}$-Br (0.176 mmol of Br initiator) was dissolved in 8.0 mL NMP in an oven-dried Schlenk tube equipped with a magnetic stir bar, resulted a viscous solution. The viscous solution was cooled to RT, and 0.46 mL HEMA (3.79 mmol) and 73.5 mL PMDETA (17.9 mmol) were added to it. Three freeze-pump-thaw cycles were performed to remove dissolved gases. The Schlenk tube was backfilled with nitrogen.

10.4 mg copper (I) chloride (0.105 mmol) and 6.7 mg copper (II) chloride (0.05 mmol) were added to the tube under a nitrogen purge. The contents were warmed to 50° C., and the greenish-brown solution was stirred for 5 hours. The reaction was diluted with 16 mL tetrahydrofuran and ~5 g basic alumina was added to bind copper ions. The mixture was filtered over a bed of Celite and basic alumina. 200 mL water was added to precipitate the polymer. The solid was collected by filtration, re-dissolved in tetrahydrofuran, and re-precipitated by adding 200 mL water. The mixture was blended using a homogenizer, filtered, and PHEMA$_{14}$-b-PSU$_{50}$-b-PHEMA$_{14}$ was then dried in vacuo at 50° C. for overnight to remove residual solvent.

PHEMA$_{22}$-b-PSU$_{50}$-b-PHEMA$_{22}$ (Sample III)—2.00 g Br-PSU$_{50}$-Br (0.176 mmol of Br initiator) was dissolved in 8.0 mL NMP in an oven-dried Schlenk tube equipped with a magnetic stir bar. The viscous solution was cooled to RT, and 0.94 mL HEMA (7.75 mmol) and 55.9 mg 2,2'-bipyridine (0.358 mmol) were added. Three freeze-pump-thaw cycles were performed to remove dissolved gases. The Schlenk tube was backfilled with nitrogen, and 13.5 mg copper (I) chloride (0.136 mmol) and 5.1 mg copper (II) chloride (0.038 mmol) were added to it under a nitrogen purge. The contents were warmed to 90° C., and the greenish-brown solution was stirred for 15 hours. The reaction was diluted with 16 mL tetrahydrofuran and ~5 g basic alumina was added to bind copper ions. The mixture was filtered over a bed of Celite and basic alumina. 200 mL water was added to precipitate the polymer. The off-white solid was collected by filtration, re-dissolved in tetrahydrofuran, and re-precipitated by adding 200 mL water. The mixture was blended using a homogenizer followed by filtration, and PHEMA$_{22}$-b-PSU$_{50}$-b-PHEMA$_{22}$ was then dried in vacuo at 50° C. overnight to remove residual solvent.

PHEMA$_{25}$-b-PSU$_{50}$-b-PHEMA$_{25}$ (Sample IV)—400 mL NMP was added to a three-necked round bottom flask equipped with a mechanical stirrer. With stirring at 200 rpm, the solvent was degassed by sparging with nitrogen for one hour. 100 g Br-PSU$_{50}$-Br (8.81 mmol of Br initiator) was then added and dissolved at 70° C. The solution was cooled to 40° C., at which point, 3.75 mL PMDETA (17.9 mmol), 30.0 mL HEMA (247 mmol), 0.526 g copper (I) chloride (5.31 mmol), and 0.296 g copper (II) chloride (2.20 mmol) were added sequentially under a nitrogen purge. The solution turned a dark green over the course of 30 minutes, and the reaction was stirred vigorously (400 rpm) for 12 hours at 40° C. The reaction was diluted with 400 mL tetrahydrofuran and basic ~50 g alumina was added to bind copper ions. The mixture was filtered over a bed of Celite and alumina. The tetrahydrofuran was removed by rotovap, and the light brown 250 g polymer solution was precipitated into 2 L water. The polymer was filtered, washed with water, and then washed with methanol. PHEMA-b-PSU$_{50}$-b-PHEMA, with repeat units of 25-50-25, was then dried in vacuo at 50° C. overnight to remove residual solvent. P(PEGMA)$_6$-b-PSU$_{50}$-b-P(PEGMA)$_6$ (Sample V)—10.0 g Br-PSU$_{50}$-Br (0.88 mmol of Br initiator) was dissolved in NMP (40.0 mL) in an oven-dried 250 mL Schlenk flask equipped with a magnetic stir bar. The viscous solution was cooled to RT, and 5.00 g PEGMA (10.5 mmol) and 0.368 mL PMDETA (1.76 mmol), were added. Three freeze-pump-thaw cycles were performed to remove dissolved gases. The Schlenk tube was backfilled with nitrogen and 56.8 mg copper (I) chloride (0.574 mmol) and 29.6 mg copper (II) chloride (0.220 mmol) were added under a nitrogen purge. The contents were warmed to 40° C., and the greenish-brown solution was stirred for 15 hours. The reaction was diluted with 80 mL tetrahydrofuran and ~20 g basic alumina was added to bind copper ions. The mixture was filtered over a bed of Celite and alumina. The tetrahydrofuran was removed by rotovap, and the light brown solution was precipitated into 1 L water using a blender. The polymer was filtered, washed with water and then with methanol, and dried in vacuo at 50° C. for overnight to remove residual solvent.

P(DMAEMA)$_{12}$-b-PSU$_{50}$-b-P(DMAEMA)$_{12}$ (Sample VI)—4.00 g Br-PSU$_{50}$-Br (0.352 mmol of Br initiator) was dissolved in 16.0 mL NMP in an oven-dried Schlenk tube equipped with a magnetic stir bar. The viscous solution was cooled to RT, and 1.106 g DMAEMA (7.03 mmol) and 0.15 mL PMDETA (0.72 mmol) were added. Three freeze-pump-thaw cycles were performed to remove dissolved gases. The Schlenk tube was backfilled with nitrogen and 20.0 mg copper (I) chloride (0.202 mmol) and 12.8 mg copper (II) chloride (0.095 mmol) were added under a nitrogen purge. The contents were warmed to 40° C., and the greenish-brown solution was stirred for 16 hours. The reaction was diluted with 16 mL tetrahydrofuran and ~5 g basic alumina was added to bind copper ions. The mixture was filtered over a bed of Celite and basic alumina. 200 mL water was added to precipitate the polymer. The off-white solid was collected by filtration, washed with water and then with methanol, and then dried in vacuo at 50° C. overnight to remove residual solvent.

TABLE 1

Compositions of PHEMA-b-PSU-b-PHEMA, P(PEGMA)-b-PSU-b-P(PEGMA), and P(DMAEMA)$_{12}$-b-PSU$_{50}$-b-P(DMAEMA)$_{12}$ block copolymers.

| Sample | Polymer Repeat Units (y/2-x-y/2) | Chemical Name | Weight Fraction [ϕ$_y$] |
|---|---|---|---|
| I | 8-50-8 | PHEMA$_8$-b-PSU$_{50}$-b-PHEMA$_8$ | 0.08 |
| II | 14-50-14 | PHEMA$_{14}$-b-PSU$_{50}$-b-PHEMA$_{14}$ | 0.13 |
| III | 22-50-22 | PHEMA$_{22}$-b-PSU$_{50}$-b-PHEMA$_{22}$ | 0.20 |
| IV | 25-50-25 | PHEMA$_{25}$-b-PSU$_{50}$-b-PHEMA$_{25}$ | 0.22 |
| V | 6-50-6 | P(PEGMA)$_6$-b-PSU$_{50}$-b-P(PEGMA)$_6$ | 0.21 |
| VI | 12-50-12 | P(DMAEMA)$_{12}$-b-PSU$_{50}$-b-P(DMAEMA)$_{12}$ | 0.14 |

Differential Scanning calorimetry (DSC)—In addition to standard NMR and GPC, the PHEMA-b-PSU-b-PHEMA block copolymer (sample III of Table 1) was further characterized using DSC. For DSC, the sample was first held at 30° C. and then heated to 200° C. at 10° C./min, followed by a cooling down to 30° C. and finally a heating up again to 200° C. The heating and cooling were carried out at a rate of 10° C./min. Glass transition temperatures were recorded on the second heating scan. Homogeneous blends of two homopolymers typically show a single glass transition temperature ($T_g$) with a value between the $T_g$s of the two individual homopolymers. Block copolymers that exhibit strong self-assembly can give two distinct glass transition temperatures. The DSC scan for PHEMA-b-PSU-b-PHEMA showed a strong $T_g$ at 155° C. for the PSU block, and a weaker $T_g$ around ~105° C., which corresponded to the HEMA block. These data clearly indicate that the PHEMA-b-PSU-b-PHEMA block copolymer was phase separated wherein the data for P(PEGMA)-b-PSU-b-P(PEGMA) did not show the same distinct dual glass transition temperatures.

Example II

Synthesis and Characterization of AB Block Copolymers

AB diblock copolymers, such as PHEMA-b-PSU and P(PEGMA)-b-PES were synthesized by a method as depicted in Scheme 2. Advantages of the AB block copolymers included larger domain sizes for phase separation, and more reproducibility in synthesis, isolation, and purification. A phenolic endcapping agent, 4-tert-butylphenol, was utilized to react with the free fluorophenylsulfone (or chlorophenylsulfone) end group, and thereby producing an ATRP-active end-capped polysulfone comprising only one active site. The chemical compositions of these AB block copolymers are shown in Scheme 2 and Table 2.

Scheme 2: Synthesis of AB-type block copolymer of a) PHEMA-b-PSU and b) PHEMA-b-PES.

a)

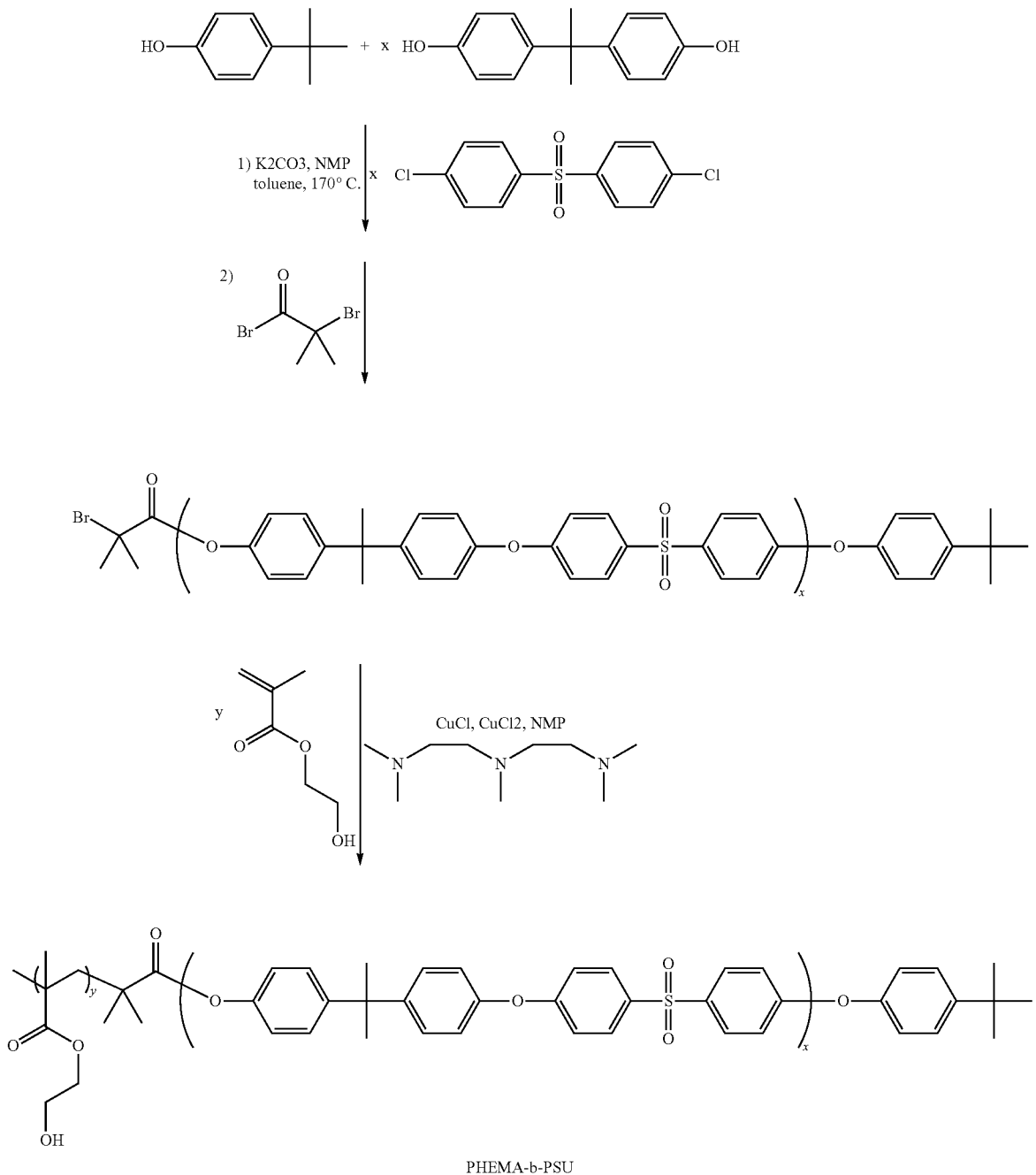

PHEMA-b-PSU

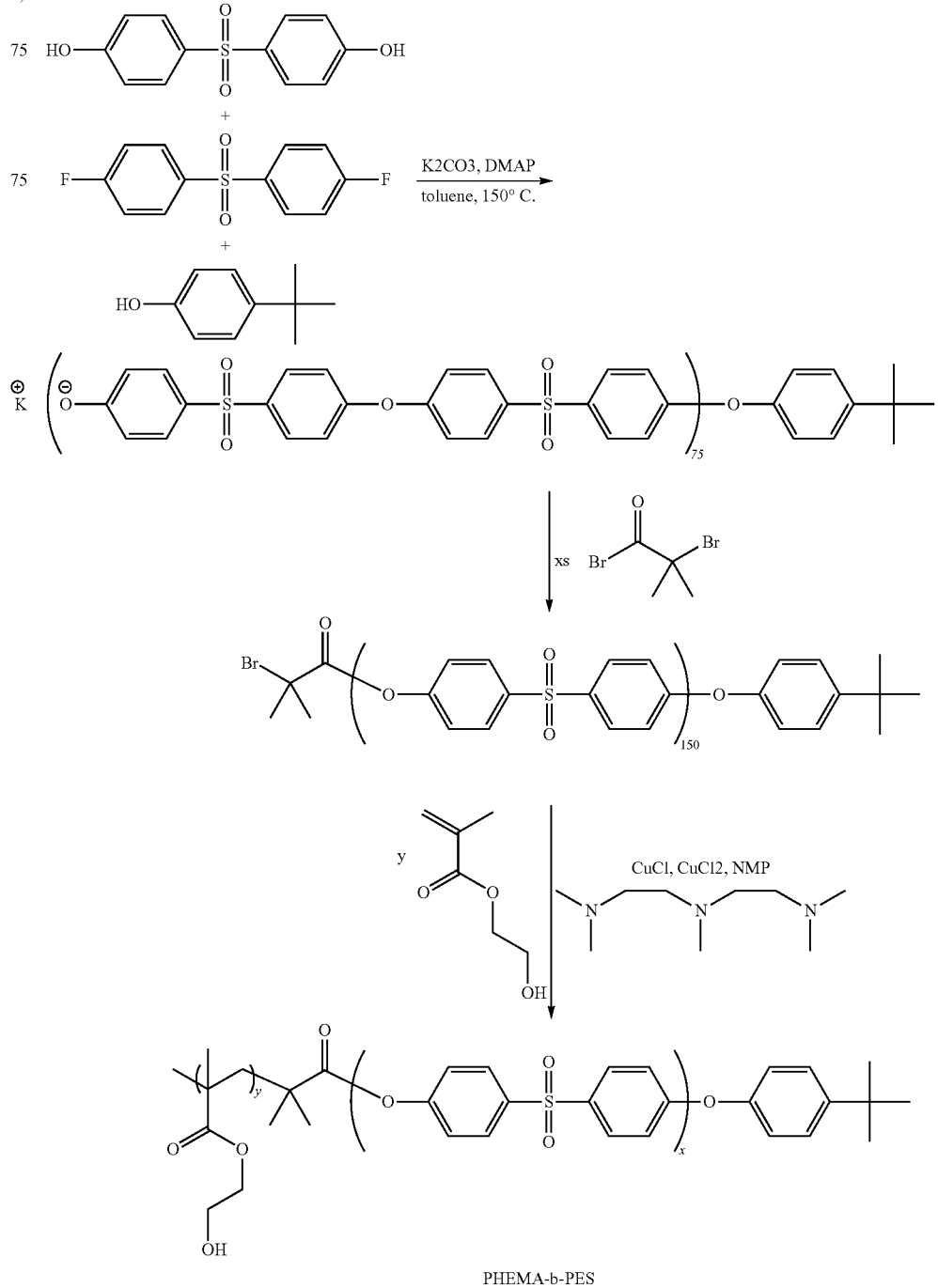

PHEMA-b-PES

Based on the performance of membrane filtration for a membrane with AB block copolymer, synthesis of PHEMA$_{19}$-b-PSU$_{75}$ (Sample IX) was initiated. The first step in this reaction scheme involved the polycondensation reaction to make an end-capped polysulfone, as shown in Scheme 2a. Bisphenol-A and 4-tert-butylphenol were reacted with dichlorodiphenylsulfone (DCDPS) in the presence of base to give the hydroxide-functionalized polysulfone, which was subsequently reacted with 2-bromoisobutyryl bromides. The reaction was successfully completed giving 97% yield and produced 6.5 kilograms of the end-capped polysulfone.

The second step of the reaction scheme (Scheme 2b) utilized ATRP to grow HEMA from approximately 3 kilograms of the end-capped polysulfone. After completion of the reaction, copper impurities were removed using basic alumina, and the filtered block copolymer was precipitated into water. Initial characterization of the block copolymer shows PHEMA$_{10}$-b-PSU$_{75}$ (Sample XI), which contained less amount of HEMA than it was anticipated. Therefore, further efforts to scale-up the synthesis were made to optimize HEMA polymerization conversion and molecular weight and compositional control on a commercial scale.

TABLE 2

AB block copolymer compositions and structure

| Samples | Polymer Repeat Units (z-y-x) | Chemical Name | $\phi_y$ | $\phi_z$ |
|---|---|---|---|---|
| VII | 0-13-50 | PHEMA$_{13}$-b-PSU$_{50}$ | 0.07 | na |
| VIII | 0-29-50 | PHEMA$_{29}$-b-PSU$_{50}$ | 0.14 | na |
| IX | 0-19-75 | PHEMA$_{19}$-b-PSU$_{75}$ | 0.07 | na |
| X | 0-37-75 | PHEMA$_{37}$-b-PSU$_{75}$ | 0.13 | na |
| XI | 0-10-75 | PHEMA$_{10}$-b-PSU$_{75}$ | 0.04 | na |
| XII | 0-22-75 | PHEMA$_{22}$-b-PSU$_{75}$ | 0.08 | na |
| XIII | 0-21-75 | PHEMA$_{21}$-b-PSU$_{75}$ | 0.08 | na |
| XIV | 0-18-75 | PHEMA$_{18}$-b-PSU$_{75}$ | 0.07 | na |
| XV | 8-11-75 | P(PEGMA)$_8$/PHEMA$_{11}$-b-PSU$_{75}$ | 0.04 | 0.11 |
| XVI | 8-0-75 | P(PEGMA)$_8$-b-PSU$_{75}$ | na | 0.1 |
| XVII | 17-0-75 | P(PEGMA)$_{17}$-b-PSU$_{75}$ | na | 0.19 |
| XVIII | 0-20-150 | PHEMA$_{20}$-b-PES$_{150}$ | 0.07 | na |
| XIX | 12-0-150 | P(PEGMA)$_{12}$-b-PES$_{150}$ | na | 0.14 |

In Table 2, $\phi_y$ is a weight fraction of HEMA block and 4 is a weight fraction of PEGMA block. An average of polymer repeat units calculated via integration from $^1$H NMR spectra (400 MHz). A 1:1 ratio of CDCl$_3$ and DMSO-d$_6$ was used for PHEMA-b-PSU and terpolymer. For P(PEGMA)-b-PSU, CDCl$_3$ was utilized and for all PES samples and DMSO-d$_6$ was employed as NMR solvent.

A platform was developed on low-fouling membrane compositions. The basic framework of AB block copolymers comprises a hydrophilic and a hydrophobic segment (polysulfone). The hydrophilic block comprises poly(2-hydroxyethyl methacrylate) (PHEMA), poly(polyethylene glycol methacrylate) (P(PEGMA)), or a random block of both PHEMA and P(PEGMA). The materials having PEG functionality are typically used to minimize protein fouling. Furthermore, the block lengths of the chains were controlled to yield materials with varying levels of PHEMA and/or P(PEGMA) functionality. Table 2 shows a list of material composition and it illustrates the breadth of compositions for materials developed.

New block copolymers using PES as the robust chemical framework were synthesized (as shown in specification, for examples of AB copolymer). PES-based materials tend to show lower fouling than the PSU-based polymers. Therefore, the HEMA and PEGMA block copolymers were synthesized with a PES framework to make a membrane with higher efficiency and lower fouling. The synthesis was similar to the PSU copolymers, and it is depicted in Scheme 2b for PHEMA-b-PES.

End-Capped Polysulfone Macroinitiator Br-PSU$_{50}$

N-Methylpyrrolidinone (NMP) (360 mL), bisphenol-A (BPA) (40.00 g, 175.2 mmol, MW=228.29 g/mol), and 4-tertbutylphenol (0.526 g, 3.50 mmol, 150.22 g/mol) were added to a three-necked round-bottomed flask equipped with addition funnel, mechanical stirrer, and a distillation head. The mixture was stirred slowly (200 rpm) to ensure complete dissolution of the bisphenol-A, and then K$_2$CO$_3$ (40.0 g, 28.9 mmol) and toluene (150 mL) were charged. With nitrogen purge, the mixture was heated to 125° C. while stirring at 500 rpm. At 125° C., water was removed azeotropically over the course of 2 hours with occasional addition of toluene (2×25 mL). Once all of the water was removed azeotropically, 4,4'-difluorodiphenylsulfone (DFDPS) (44.55 g, 175.2 mmol, MW=254.25 g/mol) was then added. Toluene (2×50 mL) was added to remove additional water. The mixture was stirred at 150° C. for about 3.5 hours, at which point a highly viscous solution was attained. GPC in NMP showed an M$_w$ of about 45 k. The light brown mixture was added to excess water to precipitate the polymer (2 L water: 250 mL polymer solution) in a homogenizer. The polymer was collected via filtration and washed with water, and then methanol. The polymer was then dried in vacuo at 70° C. to remove residual solvent.

The dried polymer was dissolved in methylene chloride (700 mL). Triethylamine (1.10 g, 10.9 mmol) and 2-bromoisobutyl bromide (2.41 g, 10.5 mmol) were added sequentially. After 30 minutes of stirring at 500 rpm, additional aliquots of triethylamine (0.30 g, 3.0 mmol) and 2-bromoisobutyl bromide (0.80 g, 3.5 mmol) were added. The reaction was stirred for 3 total hours at RT, and the light brown solution was then filtered over Celite and precipitated into methanol (2 L methanol: 350 mL polymer solution) using a homogenizer. The polymer was filtered, washed with water, and washed with methanol. Br-PSU$_{50}$ was then dried in vacuo at 70° C. overnight to remove residual solvent. CHCl$_3$ GPC (UV detector) showed a final M$_w$ of 45,100 and M$_n$ of 22,400 g/mol.

End-Capped Polysulfone Macroinitiator Br-PSU$_{75}$

N-Methylpyrrolidinone (NMP) (360 mL), bisphenol-A (BPA) (40.00 g, 175.2 mmol, MW=228.29 g/mol), and 4-tertbutylphenol (0.351 g, 2.34 mmol, 150.22 g/mol) were added to a three-necked round-bottomed flask equipped with addition funnel, mechanical stirrer, and a distillation head. The mixture was stirred slowly (200 rpm) to ensure complete dissolution of the bisphenol-A, and then K$_2$CO$_3$ (40.0 g, 28.9 mmol) and toluene (150 mL) were charged. With nitrogen purge, the mixture was heated to 125° C. while stirring at 500 rpm. At 125° C., water was removed azeotropically over the course of 2 hours with occasional addition of toluene (2×25 mL). Once all of the water was removed azeotropically, 4,4'-difluorodiphenylsulfone (DFDPS) (44.55 g, 175.2 mmol, MW=254.25 g/mol) was then added. Toluene (2×50 mL) was added to remove additional water. The mixture was stirred at 150° C. for about 3.5 hours, at which point a highly viscous solution was attained. GPC in NMP showed a M$_w$ of about 75 k. The light brown mixture was added to excess water to precipitate the polymer (2 L water: 250 mL polymer solution) in a homogenizer. The polymer was collected via filtration and washed with water, and then methanol. The polymer was then dried in vacuo at 70° C. to remove residual solvent.

The dried polymer was dissolved in methylene chloride (750 mL), and triethylamine (0.71 g, 7.0 mmol) and 2-bromoisobutyl bromide (1.61 g, 7.00 mmol) were added sequentially. After 30 minutes of stirring at 500 rpm, additional aliquots of triethylamine (0.23 g, 2.3 mmol) and 2-bromoisobutyl bromide (0.54 g, 2.3 mmol) were added. The reaction was stirred for 3 total hours at RT, and the light brown solution was then filtered over Celite and precipitated into methanol (2 L methanol: 350 mL polymer solution) using a homogenizer. The polymer was filtered, washed with water, and washed with methanol. Br-PSU$_{75}$ was then dried in vacuo at 70° C. overnight to remove residual solvent. CHCl$_3$ GPC (UV detector) showed a final M$_w$ of 75,000 and M$_n$ of 41,500 g/mol.

Scale-Up of End-Capped Polysulfone Macroinitiator Br-PSU$_{75}$

The 50-L reactor was first charged with N-methylpyrrolidinone (NMP) (14.0 L) at RT. Bisphenol-A (BPA) (3.500 kg, 15.33 mol, MW=228.29 g/mol), 4-tertbutylphenol (30.0 g, 0.200 mol, MW=150.22 g/mol), and K2CO3 (3.53 kg, 25.5 mol) were then added. The remained of NMP was added to the stirring mixture (14.0 L). The mixture was stirred slowly to ensure complete dissolution of the bisphenol-A and 4-tertbutylphenol, and then toluene (4.5 L) was charged to the reactor equipped with mechanical stirrer, Dean Stark trap, and nitrogen purge capabilities. With nitrogen purge at about 1 scfh, the mixture was heated to 110° C. (thermocouple temperature in reactor) while stirring at 200 rpm. At 110° C., water was removed azeotropically over the course of 3 hours with occasional addition of toluene (2×1.25 L).

Once all of the water was removed azeotropically, 4,4'-dichlorodiphenylsulfone (DCDPS) (4.4026 kg, 30.1 mol, MW=139.10 g/mol) was added at 40° C. Additional toluene (2×1 L) was added because additional water was removed by azeotrope. The mixture was stirred at 170° C. for 8 hours, at which point a highly viscous solution was attained. GPC in NMP showed an $M_w$ of about 70 k (~30 k $M_n$). The viscous mixture was cooled to RT and allowed to stir overnight. The insoluble components were filtered off and the filtrate was added to excess water to precipitate the polymer (30 L water: 3 L polymer solution). The polymer was collected via centrifugation and washed with water, and then methanol. The polymer was then dried in vacuo at 80° C. overnight to remove residual solvent.

The dried powder was redissolved in methylene chloride (35 L) in the 50-L reactor at RT. Once dissolution was complete, triethylamine (40 g) was added. Subsequently, 2-bromoisobutyryl bromide (90 g) was added to the stirring solution slowly over the course of 5 minutes. The reaction was stirred for 1 hour at RT, and the second aliquot of triethylamine (21 g) and 2-bromoisobutyryl bromide (90 g) were added. The reaction was stirred for an additional hour. Br-$PSU_{75}$ was precipitated into methanol (30 L methanol: 3 L polymer solution), and collected via centrifuge. The polymer was washed with water, and then methanol, and dried in vacuo at 80° C. to remove residual solvent (6.6 kg, 96.4% yield).

Synthesis of PSU Based AB Block Copolymers:

Scale-up of PHEMA-b-PSU Block Copolymers $PHEMA_{10}$-b-$PSU_{75}$ (Sample XI)—The 50-L reactor was charged with N-methylpyrrolidinone (NMP) (12.0 L) at RT and sparged with nitrogen gas for 1 hour to degas the solvent. Br-$PSU_{75}$ (3.00 kg, 0.0896 mol of Br end group, DRM630) was added to the reactor, washed down from the reactor walls with NMP (0.5 L), and dissolved in the NMP at 80° C. The reaction was cooled to 40° C., and PMDETA (37.4 mL, 0.215 mol, MW=173.3 g/mol) and HEMA (0.350 kg, 2.69 mol, MW=13.14 g/mol) were added to the solution sequentially. Then, copper (I) chloride (5.68 g, 0.0574 mol, MW=98.99 g/mol) and copper (II) chloride (2.56 g, 0.0190 mol, MW=134.45 g/mol) were added together to the solution. Once the copper contents had dissolved, the solution turned a bluish-green color. The viscous solution was stirred for 19 hours (overnight). THF (12 L) and basic alumina (1 kg) were then added to the stirring solution to remove the copper catalyst. The mixture was stirred for 1 hour, and then filtered over a Buchner funnel with Celite, washing with THF. The filtrate was added to excess water to precipitate the polymer (30 L water: 3 L polymer solution). The polymer was collected via centrifugation and washed with water, and then methanol. $PHEMA_{10}$-b-$PSU_{75}$ was then dried in vacuo at 40° C. overnight to remove residual solvent.

$PHEMA_{13}$-b-$PSU_{50}$ (Sample VII)—NMP (120 mL) was added to a three-necked round bottom flask equipped with a mechanical stirrer. With stirring at 200 rpm, the solvent was degassed by sparging with nitrogen for one hour. Br-$PSU_{50}$ (30.0 g, 1.34 mmol of Br initiator, DRM617) was then added and dissolved at 80° C. The solution was cooled to 40° C., at which point, PMDETA (0.57 mL, 2.73 mmol), HEMA (3.25 mL, 26.8 mmol), copper (I) chloride (85.1 mg, 0.86 mmol), and copper (II) chloride (37.6 mg, 0.28 mmol) were added sequentially under a nitrogen purge. The solution turned a dark green over the course of 30 minutes, and the reaction was stirred vigorously (400 rpm) for 15 hours at 40° C. The reaction was diluted with tetrahydrofuran (200 mL) and basic alumina (~50 g) was added to bind copper ions. The mixture was filtered over a bed of Celite and alumina. The tetrahydrofuran was removed by rotovap, and the light brown solution was precipitated into water (2 L water). The polymer was filtered, washed with water, and washed with methanol. $PHEMA_{13}$-b-$PSU_{50}$, with repeat units of 13-50, was then dried in vacuo at 60° C. for 2 days to remove residual solvent.

$PHEMA_{29}$-b-$PSU_{50}$ (Sample VIII)—NMP (120 mL) was added to a three-necked round bottom flask equipped with a mechanical stirrer. With stirring at 200 rpm, the solvent was degassed by sparging with nitrogen for one hour. Br-$PSU_{50}$ (30.0 g, 1.34 mmol of Br initiator, DRM617) was then added and dissolved at 80° C. The solution was cooled to 40° C., at which point, PMDETA (0.57 mL, 2.73 mmol), HEMA (6.50 mL, 53.6 mmol), copper (I) chloride (85.1 mg, 0.86 mmol), and copper (II) chloride (37.0 mg, 0.28 mmol) were added sequentially under a nitrogen purge. The solution turned a dark green over the course of 30 minutes, and the reaction was stirred vigorously (400 rpm) for 14 hours at 40° C. The reaction was diluted with tetrahydrofuran (200 mL) and basic alumina (~50 g) was added to bind copper ions. The mixture was filtered over a bed of Celite and alumina. The tetrahydrofuran was removed by rotovap, tetrahydrofuran (50 mL) was added to the viscous solution, and the light brown solution was precipitated into water (3 L water). The polymer was filtered, washed with water, and washed with methanol. $PHEMA_{29}$-b-$PSU_{75}$ was then dried in vacuo at 60° C. overnight to remove residual solvent.

$PHEMA_{19}$-b-$PSU_{75}$ (Sample IX)—NMP (120 mL) was added to a three-necked round bottom flask equipped with a mechanical stirrer. With stirring at 200 rpm, the solvent was degassed by sparging with nitrogen for one hour. Br-$PSU_{75}$ (30.0 g, 0.896 mmol of Br initiator, DRM619) was then added and dissolved at 80° C. The solution was cooled to 40° C., at which point, PMDETA (0.37 mL, 1.77 mmol), HEMA (3.30 mL, 27.2 mmol), copper (I) chloride (56.8 mg, 0.57 mmol), and copper (II) chloride (25.6 mg, 0.19 mmol) were added sequentially under a nitrogen purge. The solution turned a dark green over the course of 30 minutes, and the reaction was stirred vigorously (400 rpm) for 15 hours at 40° C. The reaction was diluted with tetrahydrofuran (200 mL) and basic alumina (~50 g) was added to bind copper ions. The mixture was filtered over a bed of Celite and alumina. The tetrahydrofuran was removed by rotovap, and the light brown solution was precipitated into water (2 L water). The polymer was filtered, washed with water, and washed with methanol. $PHEMA_{19}$-b-$PSU_{75}$ was then dried in vacuo at 80° C. overnight to remove residual solvent.

$PHEMA_{37}$-b-$PSU_{75}$ (Sample X)—NMP (120 mL) was added to a three-necked round bottom flask equipped with a mechanical stirrer. With stirring at 200 rpm, the solvent was degassed by sparging with nitrogen for one hour. Br-$PSU_{75}$ (30.0 g, 0.896 mmol of Br initiator, DRM619) was then added and dissolved at 80° C. The solution was cooled to 40° C., at which point, PMDETA (0.37 mL, 1.77 mmol), HEMA (6.60 mL, 54.4 mmol), copper (I) chloride (56.4 mg, 0.57 mmol), and copper (II) chloride (25.9 mg, 0.19 mmol) were added sequentially under a nitrogen purge. The solution turned a dark green over the course of 30 minutes, and the reaction was stirred vigorously (400 rpm) for 15 hours at 40° C. The reaction was diluted with tetrahydrofuran (200 mL) and basic alumina (~50 g) was added to bind copper ions. The mixture was filtered over a bed of Celite and alumina. The tetrahydrofuran was removed by rotovap, and the light brown solution was precipitated into water (2 L water). The polymer was filtered, washed with water, and washed with methanol. PHEMA$_{37}$-b-PSU$_{75}$ was then dried in vacuo at 80° C. overnight to remove residual solvent.

PHEMA$_{22}$-b-PSU$_{75}$ (Sample XII)—NMP (60 mL) was added to a three-necked round bottom flask equipped with a mechanical stirrer. With stirring at 200 rpm, the solvent was degassed by sparging with nitrogen for one hour. Br-PSU$_{75}$ (15.0 g, 0.448 mmol of Br initiator, DRM619) was then added and dissolved at 80° C. The solution was cooled to 40° C., at which point, HEMA (3.30 mL, 27.2 mmol), copper (I) chloride (28.7 mg, 0.29 mmol), copper (II) chloride (12.9 mg, 0.10 mmol), and PMDETA (0.19 mL, 0.89 mmol) were added sequentially under a nitrogen purge. The solution turned a dark green over the course of 30 minutes, and the reaction was stirred vigorously (400 rpm) for 2.25 hours at 40° C. when conversion reached ~45% (via $^1$H NMR in CDCl$_3$). The reaction was diluted with tetrahydrofuran (120 mL) and basic alumina (30 g) was added to bind copper ions. The mixture was filtered over a bed of Celite and alumina. The tetrahydrofuran was removed by rotovap, and the light brown solution was precipitated into water (2 L water). The polymer was filtered, washed with water, and washed with methanol. PHEMA$_{22}$-b-PSU$_{75}$ was then dried in vacuo at 80° C. overnight to remove residual solvent.

PHEMA$_{21}$-b-PSU$_{75}$ (Sample XIII)—NMP (120 mL) was added to a three-necked round bottom flask equipped with a mechanical stirrer. With stirring at 200 rpm, the solvent was degassed by sparging with nitrogen for one hour. Br-PSU$_{75}$ (30.0 g, 0.896 mmol of Br initiator, DRM628) was then added and dissolved at 80° C. The solution was cooled to 0° C., at which point, HEMA (3.30 mL, 27.2 mmol), copper (I) chloride (56.8 mg, 0.57 mmol), copper (II) chloride (25.9 mg, 0.19 mmol), and PMDETA (0.37 mL, 1.77 mmol) were added sequentially under a nitrogen purge. The solution turned a dark green over the course of 30 minutes, and the reaction was stirred vigorously (250 rpm) for 15 hours at 40° C. The reaction was diluted with tetrahydrofuran (240 mL) and basic alumina (30 g) was added to bind copper ions. The mixture was filtered over a bed of Celite and alumina. The tetrahydrofuran was removed by rotovap, and the light brown solution was precipitated into water (2 L water). The polymer was filtered, washed with water, and washed with methanol. PHEMA$_{21}$-b-PSU$_{75}$ was then dried in vacuo at 90° C. for 4 days to remove residual solvent. The dried polymer was rechopped in a blender with methanol to remove NMP impurities, and redried at 90° C. overnight.

PHEMA$_{18}$-b-PSU$_{75}$ (Sample XIV)—NMP (120 mL) was added to a three-necked round bottom flask equipped with a mechanical stirrer. With stirring at 200 rpm, the solvent was degassed by sparging with nitrogen for one hour. Br-PSU$_{75}$ (30.0 g, 0.896 mmol of Br initiator, DRM630) was then added and dissolved at 80° C. The solution was cooled to 0° C., at which point, HEMA (3.30 mL, 27.2 mmol), copper (I) chloride (56.4 mg, 0.57 mmol), copper (II) chloride (25.3 mg, 0.19 mmol), and PMDETA (0.36 mL, 1.72 mmol) were added sequentially under a nitrogen purge. The solution turned a dark green over the course of 30 minutes, and the reaction was stirred vigorously (300 rpm) for 26 hours at 40° C. The reaction was diluted with tetrahydrofuran (240 mL) and basic alumina (30 g) was added to bind copper ions. The mixture was filtered over a bed of Celite and alumina. The tetrahydrofuran was removed by rotovap, and the light brown solution was precipitated into water (2 L water). The polymer was filtered, washed with water, and washed with methanol. PHEMA$_{18}$-b-PSU$_{75}$ was then dried in vacuo at 80° C. overnight to remove residual solvent. The dried polymer was rechopped in a blender with methanol to remove NMP impurities, and redried at 90° C. overnight.

P(PEGMA)$_8$/PHEMA$_n$-b-PSU$_{75}$ (Sample XV)—NMP (120 mL) was added to a three-necked round bottom flask equipped with a mechanical stirrer. With stirring at 200 rpm, the solvent was degassed by sparging with nitrogen for one hour. Br-PSU$_{75}$ (30.0 g, 0.896 mmol of Br initiator, DRM630) was then added and dissolved at 80° C. The solution was cooled to 0° C., at which point, HEMA (2.00 mL, 27.2 mmol), PEGMA (4.00 g, 8.42 mmol), copper (I) chloride (57.8 mg, 0.58 mmol), copper (II) chloride (25.0 mg, 0.19 mmol), and PMDETA (0.36 mL, 1.72 mmol) were added sequentially under a nitrogen purge. The solution turned a dark green over the course of 30 minutes, and the reaction was stirred vigorously (300 rpm) for 3 days at 40° C. The reaction was diluted with tetrahydrofuran (240 mL) and basic alumina (30 g) was added to bind copper ions. The mixture was filtered over a bed of Celite and alumina. The tetrahydrofuran was removed by rotovap, and the light brown solution was precipitated into water (2 L water). The polymer was filtered, washed with water, and washed with methanol. The random copolymer of P(PEGMA)$_8$/PHEMA$_{11}$-b-PSU$_{75}$ was then dried in vacuo at 80° C. overnight to remove residual solvent. The dried polymer was rechopped in a blender with methanol to remove NMP impurities, and redried at 90° C. overnight.

P(PEGMA)-8-b-PSU$_{75}$ (Sample XVI)—NMP (120 mL) was added to a three-necked round bottom flask equipped with a mechanical stirrer. With stirring at 200 rpm, the solvent was degassed by sparging with nitrogen for one hour. Br-PSU$_{75}$ (30.0 g, 0.896 mmol of Br initiator, DRM630) was then added and dissolved at 80° C. The solution was cooled to 0° C., at which point, PEGMA (6.16 g, 13.0 mmol), copper (I) chloride (56.5 mg, 0.57 mmol), copper (II) chloride (25.0 mg, 0.19 mmol), and PMDETA (0.36 mL, 1.72 mmol) were added sequentially under a nitrogen purge. The solution turned a dark green over the course of 30 minutes, and the reaction was stirred vigorously (300 rpm) for 3 hours at 40° C. and an additional 3 days at 50° C. The reaction was diluted with tetrahydrofuran (240 mL) and basic alumina (30 g) was added to bind copper ions. The mixture was filtered over a bed of Celite and alumina. The tetrahydrofuran was removed by rotovap, and the light brown solution was precipitated into water (2 L water). The polymer was filtered, washed with water, and washed with methanol. P(PEGMA)-8-b-PSU$_{75}$ was then dried in vacuo at 80° C. overnight to remove residual solvent. The dried polymer was rechopped in a blender with methanol to remove NMP impurities, and redried at 90° C. overnight.

P(PEGMA)$_{17}$-b-PSU$_{75}$ (Sample XVII)—NMP (120 mL) was added to a three-necked round bottom flask equipped with a mechanical stirrer. With stirring at 200 rpm, the solvent was degassed by sparging with nitrogen for one hour. Br-PSU$_{75}$ (30.0 g, 0.896 mmol of Br initiator) was then added and dissolved at 80° C. The solution was cooled to 0° C., at which point, PEGMA (12.0 g, 25.3 mmol), copper (I) chloride (56.5 mg, 0.57 mmol), copper (II) chloride (25.8 mg, 0.19 mmol), and PMDETA (0.36 mL, 1.72 mmol) were added sequentially under a nitrogen purge. The solution turned a dark green over the course of 30 minutes, and the reaction was stirred vigorously (400 rpm) for 16 hours at 40° C. The reaction was diluted with tetrahydrofuran (240 mL) and basic alumina (~50 g) was added to bind copper ions. The mixture was filtered over a bed of Celite and alumina. The tetrahydrofuran was removed by rotovap, and the light brown solution was precipitated into water (2 L water). The polymer was centrifuged and the supernatant was discarded, washed with water, and washed with methanol. P(PEGMA)$_{17}$-b-PSU$_{75}$ was then dried in vacuo at 80° C. overnight to remove residual solvent. The dried polymer was rechopped in a blender with methanol to remove NMP impurities, and redried at 90° C. overnight.

Synthesis of PES Based AB Block Copolymers

End-capped Polysulfone Macroinitiator Br-$PES_{150}$-N,N-Dimethylacetamide (DMAc) (450 mL), bisphenol-S (BPS) (50.00 g, 199.8 mmol, MW=250.27 g/mol), and 4-tertbutylphenol (0.400 g, 2.66 mmol, 150.22 g/mol) were added to a three-necked round-bottomed flask equipped with addition funnel, mechanical stirrer, and a distillation head. The mixture was stirred slowly (200 rpm) to ensure complete dissolution of the BPS, and then $K_2CO_3$ (50.1 g, 362 mmol) and toluene (100 mL) were charged. The mixture needed to be stirred extremely vigorously (600-800 rpm) because the dipotassium salt formed was insoluble in DMAc and formed thick slurry. With nitrogen purge, the mixture was heated to 125° C. and water was removed azeotropically over the course of 2 hours with occasional addition of toluene (2×50 mL). Then, 4,4'-difluorodiphenylsulfone (DFDPS) (50.80 g, 199.8 mmol, MW=254.25 g/mol) was added. Toluene (2×50 mL) was added to remove additional water. Within about 20-30 minutes the precipitated dianionic salt dissolved as it oligomerized with DFDPS. The mixture was stirred at 150° C. for 17 hours, at which point a highly viscous solution was attained. The reaction was cooled to room temperature, and the light brown mixture was added to excess water to precipitate the polymer (2 L water: 250 mL polymer solution) in a homogenizer. The polymer was collected via filtration and washed with water, and then methanol. The polymer was then dried in vacuo at 90° C. to remove residual solvent.

The dried polymer was dissolved in NMP (700 mL), and triethylamine (0.81 g, 8.00 mmol) and 2-bromoisobutyl bromide (1.83 g, 7.96 mmol) were added sequentially. After 30 minutes of stirring at 500 rpm, additional aliquots of triethylamine (0.30 g, 3.0 mmol) and 2-bromoisobutyl bromide (0.67 g, 2.9 mmol) were added. The reaction was stirred for 3 hours at RT, and the light brown solution was precipitated into methanol (2 L methanol: 350 mL polymer solution) using a homogenizer. The polymer was filtered and washed with methanol. Br-$PES_{150}$ was then dried in vacuo at 70° C. overnight to remove residual solvent.

$PHEMA_{20}$-b-$PES_{150}$ (Sample XVIII)—NMP (120 mL) was added to a three-necked round bottom flask equipped with a mechanical stirrer. With stirring at 200 rpm, the solvent was degassed by sparging with nitrogen for one hour. Br-$PES_{150}$ (30.0 g, 0.850 mmol of Br initiator, DRM640) was then added and dissolved at 80° C. The solution was cooled to 0° C., at which point, HEMA (3.30 mL, 27.2 mmol), copper (I) chloride (56.1 mg, 0.57 mmol), copper (II) chloride (24.2 mg, 0.18 mmol), and PMDETA (0.36 mL, 1.72 mmol) were added sequentially under a nitrogen purge. The solution turned a dark green over the course of 30 minutes, and the reaction was stirred vigorously (300 rpm) for 3 days at 40° C. The reaction was diluted with tetrahydrofuran (240 mL) and basic alumina (30 g) was added to bind copper ions. The mixture was filtered over a bed of Celite and alumina. The light brown solution was precipitated into water (2 L water). The polymer was filtered and washed with water. $PHEMA_{20}$-b-$PES_{150}$ was then dried in vacuo at 80° C. overnight to remove residual solvent. The dried polymer was chopped in a blender with methanol to remove NMP impurities, and re-dried at 90° C. overnight.

$P(PEGMA)_{12}$-b-$PES_{150}$ (Sample XIX)—NMP (120 mL) was added to a three-necked round bottom flask equipped with a mechanical stirrer. With stirring at 200 rpm, the solvent was degassed by sparging with nitrogen for one hour. Br-$PES_{150}$ (30.0 g, 0.850 mmol of Br initiator, DRM640) was then added and dissolved at 80° C. The solution was cooled to 0° C., at which point, PEGMA (9.00 g, 18.9 mmol), copper (I) chloride (56.7 mg, 0.57 mmol), copper (II) chloride (23.5 mg, 0.18 mmol), and PMDETA (0.355 mL, 1.70 mmol) were added sequentially under a nitrogen purge. The solution turned a dark green over the course of 30 minutes, and the reaction was stirred vigorously (300 rpm) for 17 hours at 40° C. The reaction was diluted with tetrahydrofuran (240 mL) and basic alumina (30 g) was added to bind copper ions. The mixture was filtered over a bed of Celite and alumina. The light brown solution was precipitated into water (2 L water). The polymer was filtered and washed with water. $P(PEGMA)_{12}$-b-$PES_{150}$ was then dried in vacuo at 80° C. overnight to remove residual solvent. The dried polymer was chopped in a blender with methanol to remove NMP impurities, and re-dried in vacuo at 90° C. overnight.

$P(DMAEMA)_{13}$-b-$PES_{150}$-NMP (120 mL) was added to a three-necked round bottom flask equipped with a mechanical stirrer. With stirring at 200 rpm, the solvent was degassed by sparging with nitrogen for one hour. Br-$PES_{150}$ (30.0 g, 0.850 mmol of Br initiator, DRM645) was then added and dissolved at 80° C. The solution was cooled to 0° C., at which point, DMAEMA (6.00 g, 38.2 mmol), copper (I) chloride (56.1 mg, 0.57 mmol), copper (II) chloride (24.3 mg, 0.18 mmol), and PMDETA (0.36 mL, 1.72 mmol) were added sequentially under a nitrogen purge. The solution turned a dark green over the course of 30 minutes, and the reaction was stirred vigorously (300 rpm) for 20 hours at 40° C. The reaction was diluted with tetrahydrofuran (240 mL) and basic alumina (30 g) was added to bind copper ions. The mixture was filtered over a bed of Celite and alumina. The light brown solution was precipitated into water (2 L water). The polymer was filtered and washed with water. $P(DMAEMA)_{13}$-b-$PES_{150}$ was then dried in vacuo at 80° C. overnight to remove residual solvent. The dried polymer was chopped in a blender with methanol to remove NMP impurities, and re-dried in vacuo at 90° C. overnight.

Example III

Membrane Development by Phase Separation/Phase Inversion

Phase inversion for all samples was performed in a similar fashion. Phase inversion of PHEMA-b-PSU-b-PHEMA is used as a representative example. PHEMA-b-PSU-b-PHEMA (1.0 g) was dissolved in a mixed solvent solution (4.0 g) of dioxolane and DMSO (7:3 dioxolane:DMSO). The 10 ml solution was manually cast using a BYK Gardner doctor blade onto a glass plate. A dwell time of 5 seconds was imposed before submerging the glass plate into a coagulation bath of DI water at room temperature. The sample was soaked in water overnight, removed from the water bath, and dried in ambient temperatures.

Figure 1B:
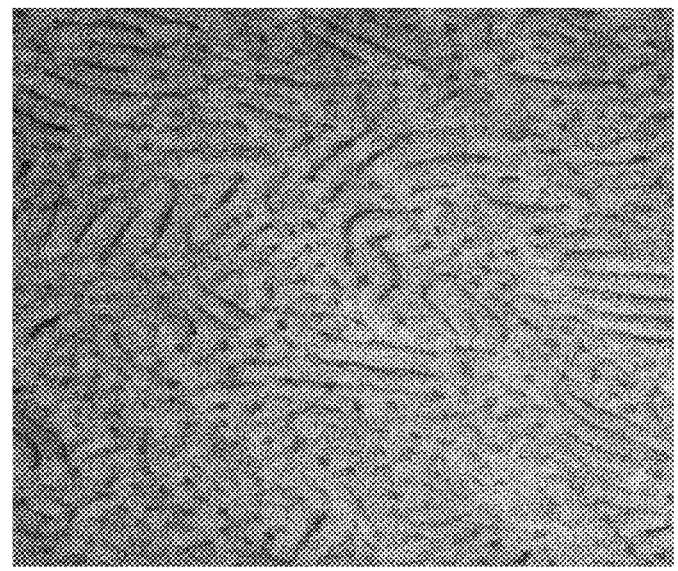
Figure 2A:
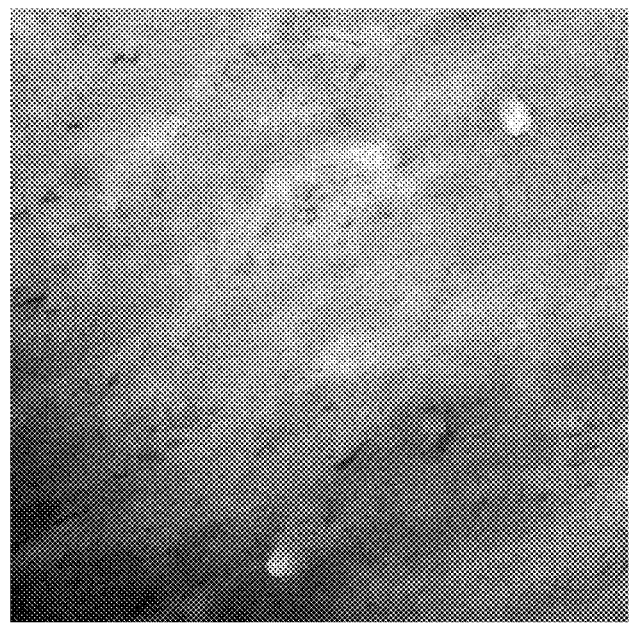
FIGS. 2A and 2B are TEM images of embodiments of P(PEGMA)-b-PSU-b-P(PEGMA) thin films used in one or more of the membranes of the invention and made via evaporation of a THF solution.
Figure 2B:

Thin films of PHEMA-b-PSU-b-PHEMA (Sample III, with 22-50-22 repeat units) were made via solvent evaporation of polymeric solutions in THF to determine microphase separation of the block copolymers. The thin films were stained with ruthenium tetroxide ($RuO_4$) and analyzed by transmission electron microscopy (TEM). The TEM images showed cylindrical morphology with no long-range order. FIGS. 1A and 1B show TEM images of PHEMA-b-PSU-b-PHEMA (Sample III, $\phi_{HEMA}$=0.20) thin films made via evaporation of a THF solution. A cylindrical morphology with the dark portions is shown which are made of HEMA and the films include smaller microdomains. The cylindrical microdomains possess diameters range from about 10 to about 20 nm without evidence of a long-range order. Cylindrical morphologies were also observed with P(PEGMA)-b-PSU-b-P(PEGMA) thin films wherein, P(PEGMA)-b-PSU-b-P(PEGMA) ($\phi_{PEGMA}$=0.21) thin films were made via evaporation of a THF solution. Similar to PHEMA-b-PSU-b-PHEMA, a cylindrical morphology with PEG is shown as the dark, smaller microdomain as illustrated in FIGS. 2A and 2B. The cylindrical microdomains formed for PEG, which possess diameters range from about 5 to about 10 nm without evidence of a long-range order. Therefore, in the TEM images, the darker segments correspond to either the HEMA or PEGMA blocks, whereas the lighter segments are indicative of the polysulfone blocks. Therefore, microphase separation of the PSU-based block copolymers was clearly imaged by FIGS. 1A, 1B, 2A, and 2B.

Figure 3A:
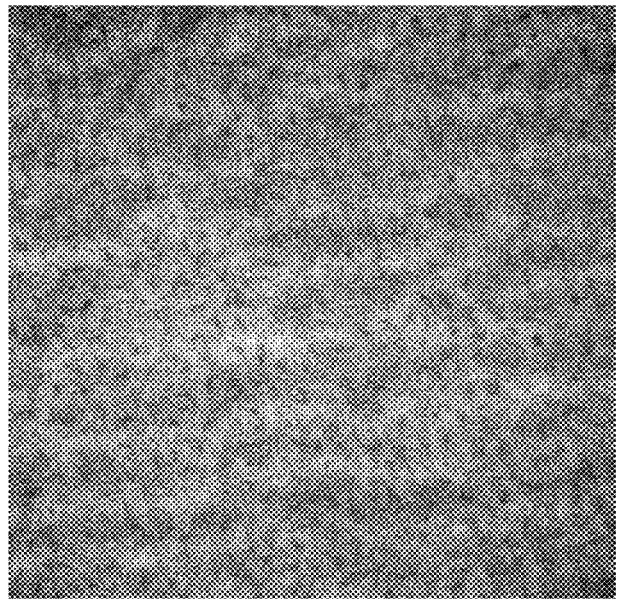
FIGS. 3A and 3B are TEM images of embodiments of PHEMA-b-PSU thin films used in one or more of the membranes of the invention and made via evaporation of a THF solution.
Figure 3B:
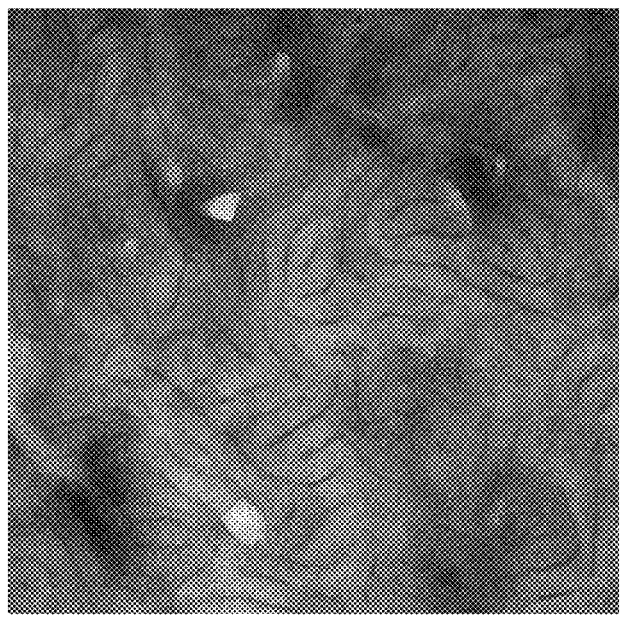

Phase separation was also investigated for the AB-based copolymers, such as PHEMA-b-PSU, which is illustrated in FIGS. 3A and 3B. The weight fractions ($\phi$) of HEMA thin films for samples IX and X were of about 0.07 and about 0.13 respectively. The thin films were casted from THF and imaged by TEM. The lower weight fraction of sample IX showed spherical morphologies, whereas the higher weight fraction of sample X produced similar cylindrical morphologies as its ABA analog. A spherical morphology (with HEMA as the dark, smaller microdomain) is observed for sample IX, whereas a cylindrical morphology is observed for sample X. The spacing between the cylindrical microdomains of HEMA is about 30 nm without evidence of long-range order.

To create most robust phase-inverted membranes, several factors were controlled to optimize pore structure. The factors include but not limited to a polymer composition, a dope composition, the conditions for a coagulation bath, an environmental condition, a polymer concentration, and solubility parameters. The polymer composition was optimized by varying molecular weight (N), respective block length (f), and PDI. The dope composition was optimized by accurately selecting solvent, antisolvent (NMP, THF, TEG, PEG400), and porogen. The environmental conditions, such as temperature, humidity, and the medium of the coagulation bath were standardized for each composition.

For both PHEMA-b-PSU-b-PHEMA and P(PEGMA)-b-PSU-b-P(PEGMA) compositions, the block copolymer concentration was in a range from about 14 to about 25 wt %. For example, about 20 wt % of dope solution of P(PEGMA)-b-PSU-b-P(PEGMA) in THF and triethylene glycol (TEG) was formulated, and the solution was cast on a glass slide. After 1-2 seconds, the colorless solution became opaque on the slide surface, indicative of evaporation induced phase separation (EIPS). Subsequent to a 10-second dwell time, phase inversion throughout the remainder of the cast film was initiated by immersing the cast solution into a bath of de-ionized (DI) water at a room temperature.

Figure 4:
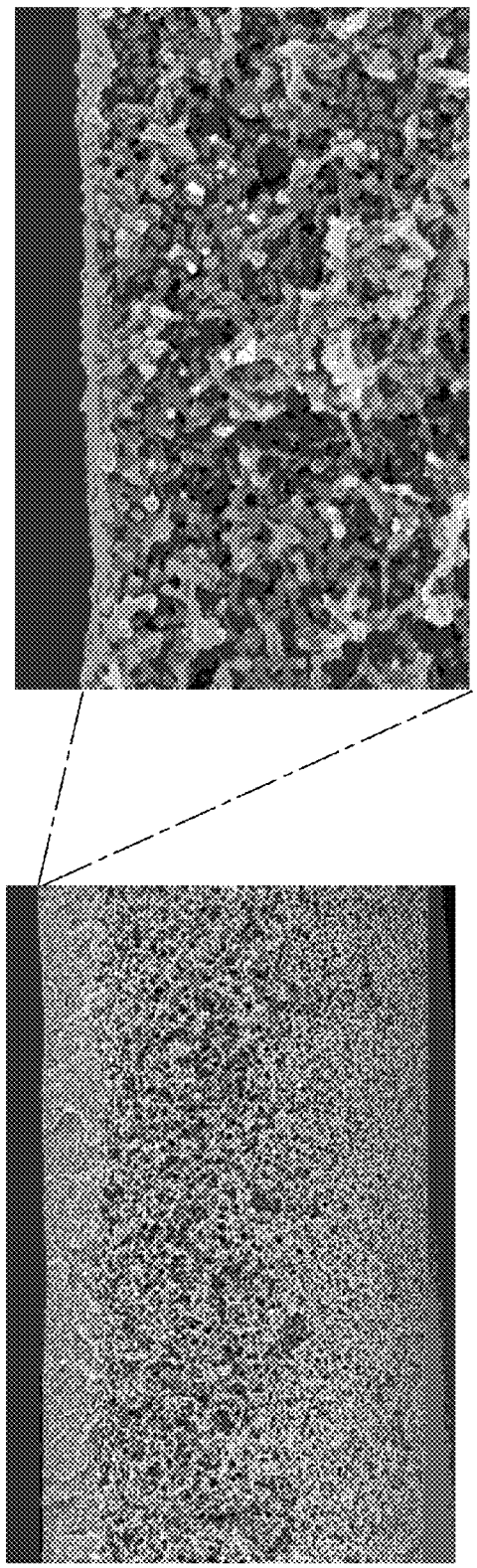
FIG. 4 is a scanning electron microscopy (SEM) image of the embodiments of cross-section of P(PEGMA)-b-PSU-b-P(PEGMA) membrane. A magnification of 180,000 times for the same SEM image is also depicted.
Figure 5:
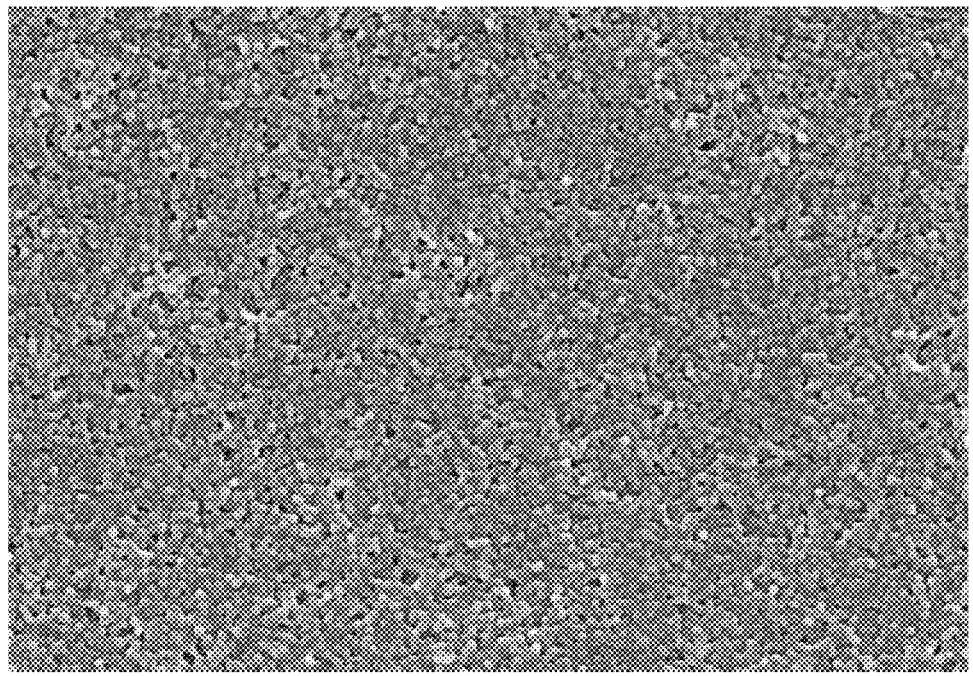
FIG. 5 is a SEM image of an embodiment of the surface of P(PEGMA)-b-PSU-b-P(PEGMA) membrane of the invention.
Figure 6A:
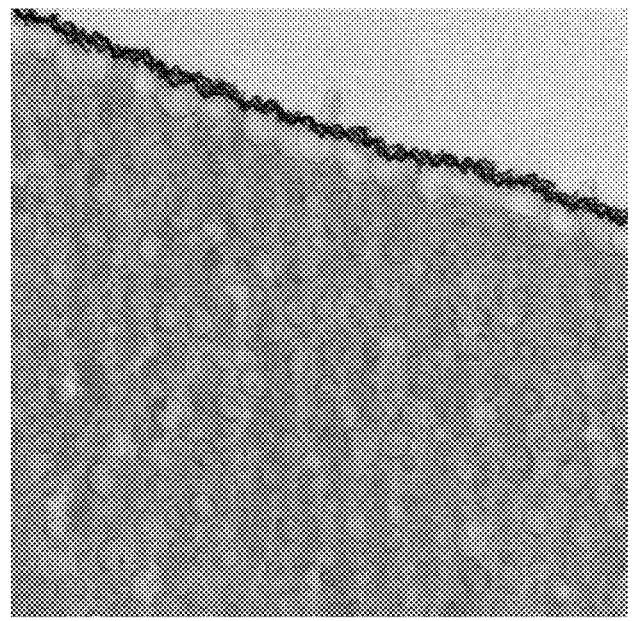
FIG. 6A is a TEM image of an embodiment of P(PEGMA)-b-PSU-b-P(PEGMA) membrane stained with $RuO_4$ and FIG. 6B is a TEM image of an embodiment of P(PEGMA)-b-PSU-b-P(PEGMA) membrane of the invention without stain.
Figure 6B:
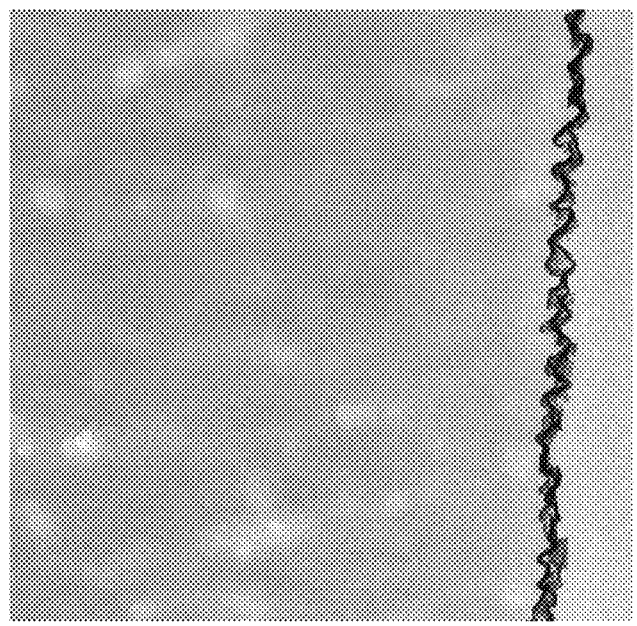

Upon extensive soaking in water and subsequent drying, phase separated polymeric membranes of P(PEGMA)-b-PSU-b-P(PEGMA) were shown to be extremely hydrophilic in nature. The SEM images of cross section of P(PEGMA)-b-PSU-b-P(PEGMA) membrane are shown in FIG. 4. A spongy, asymmetric porous structure was observed for P(PEGMA)-b-PSU-b-P(PEGMA) membrane. The images of the cross sectional view of the membrane illustrate the asymmetric structure comprising a dense conformation at the top surface and a more porous structure in the middle of the membrane. SEM images of the top surface of the membrane reveal cylindrical morphologies due to EIPS, as seen in FIG. 5. The cylinders can also be observed through the membrane cross section. The TEM images of the P(PEGMA)-b-PSU-b-P(PEGMA) membranes show the pores were filled with epoxy, and the membrane was micro-tomed, and selectively stained with $RuO_4$. The image of the membrane stained with $RuO_4$ is shown in FIG. 6A whereas the image of the membrane unstained is served as a control as shown in FIG. 6B. The $RuO_4$ preferentially stains the PEG-based chains and definitively demonstrates that PEG chains are on the pore surface.

Example IV

Determination of Virus Filtration Efficiency by Membrane Flux and Permeability

Membrane flux and permeability of a single or multiple layer of membrane was determined using two buffers and de-ionized (DI) water. The time required for 10 ml of Tris buffer (25 mM) with 100 mM NaCl to flow through a three layers of membrane was determined at a set level of pressure. The membrane was held in a 25 mm glass filter holder (Millipore) and the vacuum was typically set at 27" Hg or 5" mm of Hg. Times were also measured for 70 mM phosphate buffer at pH 6.5 and DI water. A needle gauge was used to regulate the vacuum (Glass Filter holder, 25 mm with stainless steel support, Millipore Corp XX10 025 30; Needle gauge, Cole-Parmer Instrument Corp, K-06393-61, Vacuum gauge, Ashcroft Corp, 238A 460-02).

Clearance of virus is better for the matrix of the invention (Sample IX) than a commercial polysulfone membrane (GE Water) as shown in Table 3, at average feeding pressure of about 12 to 24 psi. The virus filtration testing was performed on 3-layer membranes of GE Water polysulfone ultrafiltration membranes, and the membrane with A-B type block copolymer matrix of the invention. The experiment compares GE Water polysulfone, which is not a block copolymer, with block copolymer membranes of two different block copolymers of PHEMA-b-PSU compositions. Average pore size for both of these polysulfone membranes is about 20 nm, which should theoretically selectively filter out parvovirus. The data shows the A-B type block copolymer membrane of samples VII, and IX are efficient for viral log reduction having high value, such as, LRV>6.

TABLE 3

| Membrane flux and permeability for A-B type block copolymer membrane | | | | | |
|---|---|---|---|---|---|
| Sample | Filtration area (cm²) | Setting flow rate (ml/min) | Equivalent virus feed flux (LMH) | Equivalent virus permeability (LMH/psi) | LRV |
| GE Water | 3.9 | 0.13 | 4.5 | 0.2 | 2.3 ± 0.16 |
| Sample IX | 3.9 | 0.13 | 29.8 | 1.4 | >6 |
| Sample V11 | 3.9 | 0.13 | 25.2 | 2.0 | 6.0 ± 0.24. |

Virus clearance for another type of block copolymer matrix of the invention (Samples VI, and VII) at average feeding pressure of about 34 psi is also shown in Table 4. The virus filtration testing was performed for the membrane with A-B-A type block copolymer matrix of the invention. The experiment was performed with two different A-B-A type block copolymers compositions. The data show that the A-B-A type block copolymer membrane is efficient for viral log reduction with LRV>4.

TABLE 4

Membrane flux and permeability for A-B-A type block copolymer membrane

| Sample | Filtration area (cm$^2$) | Setting flow rate (ml/min) | Equivalent virus feed flux (LMH) | Equivalent virus permeability (LMH/psi) | LRV |
|---|---|---|---|---|---|
| Sample VI | 3.9 | 0.13 | 11.8 | 0.3 | >4 |
| Sample VII | 3.9 | 0.13 | 2.5 | 0.1 | 4.8 ± 0.1 |

The invention claimed is:

1. A separation matrix comprising:

a porous surface layer; and a bulk porous support, wherein both the porous surface layer and the bulk porous support comprise a self-assembling block copolymer having a polydispersity index in a range from about 2 to about 5, wherein the block copolymer comprises A-B or A-B-A repeating units, wherein A and B, at each occurrence, are two different blocks comprising an oligomer or a polymer, and wherein a structural unit of block A is derived from one or more atom transfer radical polymerization (ATRP)-active monomer or oligomer comprising one or more acrylates, methacrylates, acrylamides, methacrylamides, styrenics, vinyl pyridines, acrylonitriles, or a combination thereof and a structural unit of block B is derived from a thermoplastic ATRP-active macroinitiator of structure IV, V or VI:

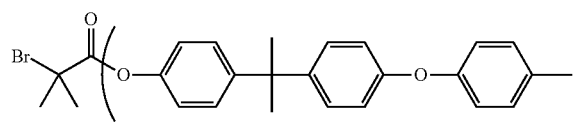

(IV)

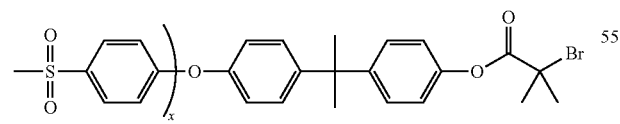

(V)

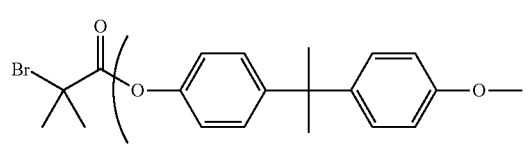

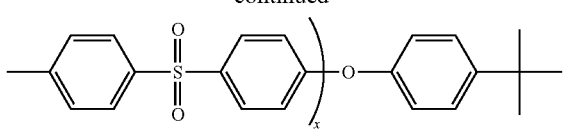

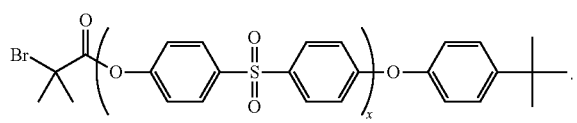

(VI)

2. The separation matrix of claim 1, wherein the porous surface layer comprises a plurality of pores formed by phase inversion.

3. The separation matrix of claim 2, wherein the pores have a diameter in a range from about 5 nm to about 5 micron.

4. The separation matrix of claim 3, wherein the pores have a diameter in a range from about 20 nm to about 100 nm.

5. The separation matrix of claim 1, wherein the ATRP active monomer or oligomer is a hydrophilic unit, and the thermoplastic ATRP-active macro initiator is a hydrophobic unit.

6. The separation matrix of claim 1, wherein the ATRP-active monomer or oligomer comprise 2-hydroxyethyl methacrylate (HEMA).

7. A separation matrix comprising:

a porous surface layer; and a bulk porous support, wherein both the porous surface layer and the bulk porous support comprises a self assembling block copolymer having a polydispersity index of at least about 2, wherein the block copolymer comprises A-B-A repeating units, and wherein A and B, at each occurrence, are two different blocks comprising an oligomer or a polymer, and wherein a structural unit of block A is derived from one or more atom transfer radical polymerization (ATRP)-active monomer or oligomer comprising one or more acrylates, methacrylates, acrylamides, methacrylamides, styrenics, vinyl pyridines, acrylonitriles, or a combination thereof and a structural unit of block B is derived from a thermoplastic ATRP-active macroinitiator of structure IV, V or VI:
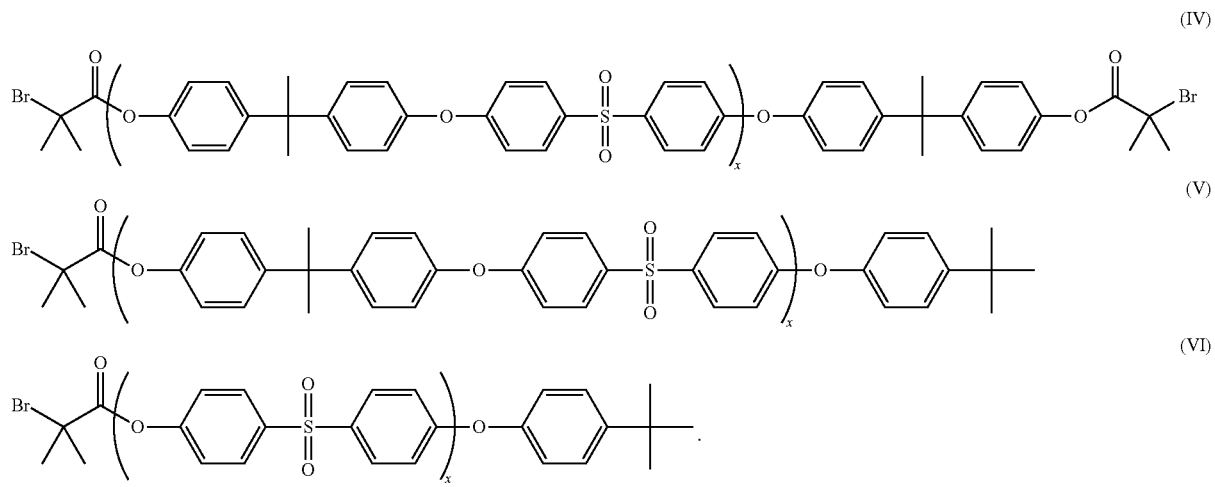
(IV)
(V)
(VI)
8. The separation matrix of claim 1, wherein the A-B block copolymer is selected from:
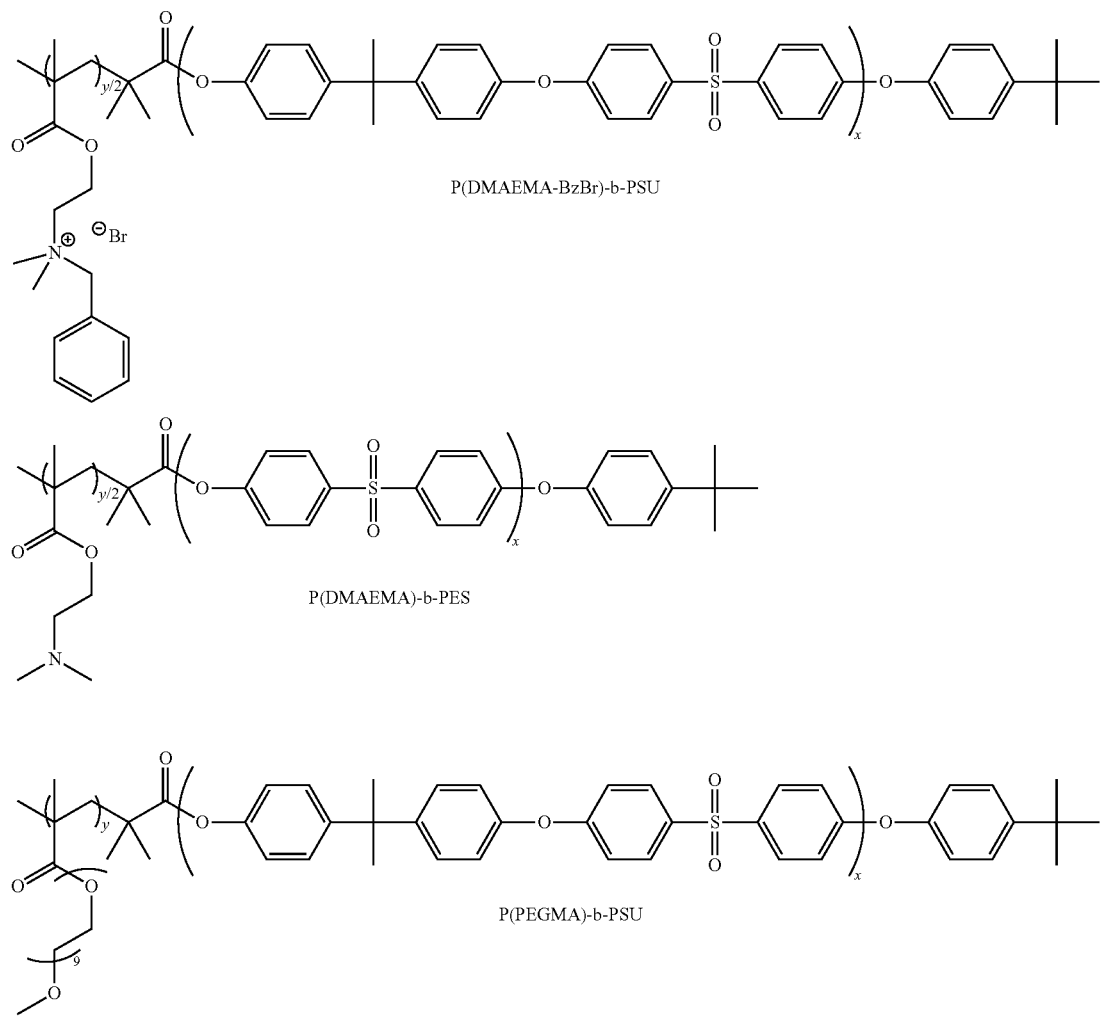
P(DMAEMA-BzBr)-b-PSU
P(DMAEMA)-b-PES
P(PEGMA)-b-PSU -continued
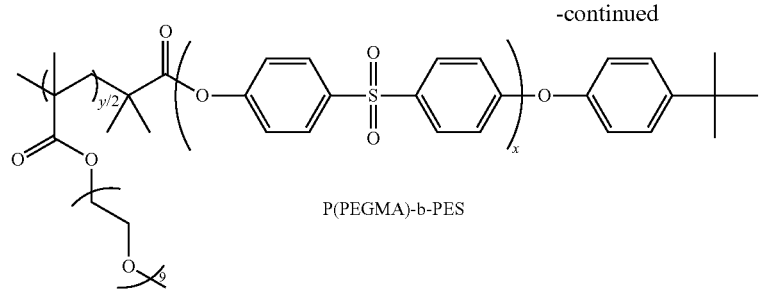
P(PEGMA)-b-PES
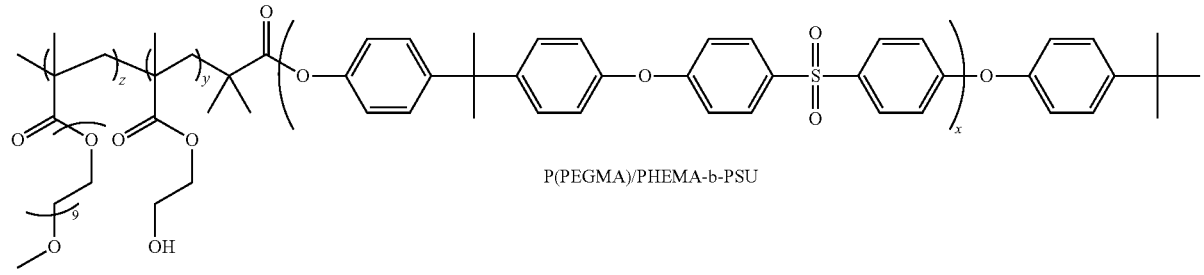
P(PEGMA)/PHEMA-b-PSU
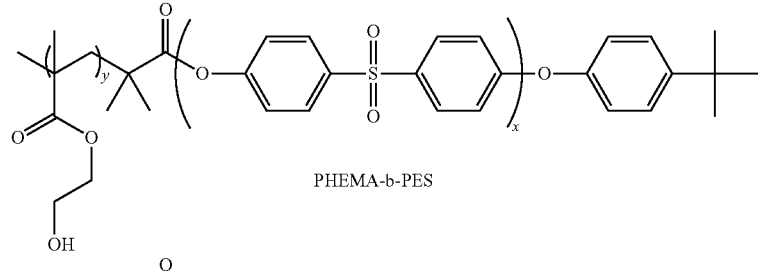
PHEMA-b-PES
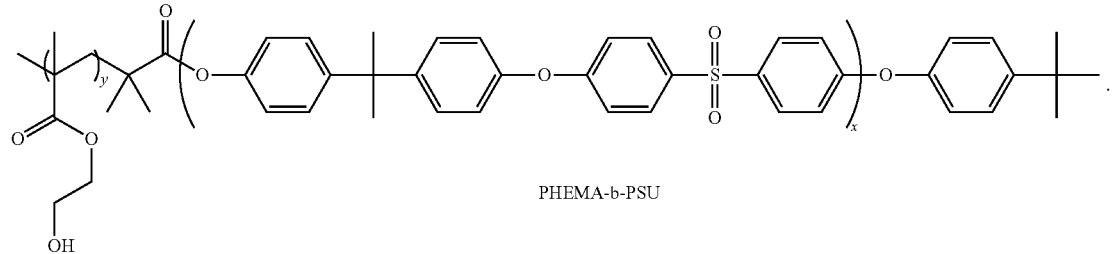
PHEMA-b-PSU
9. The separation matrix of claim 1, wherein the A-B-A block copolymer is selected from:
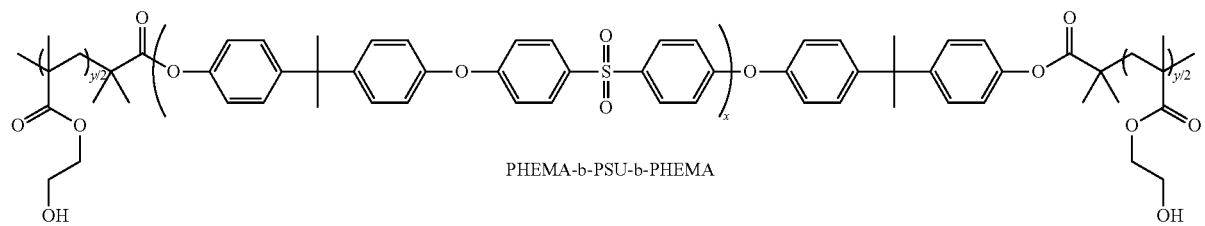
PHEMA-b-PSU-b-PHEMA
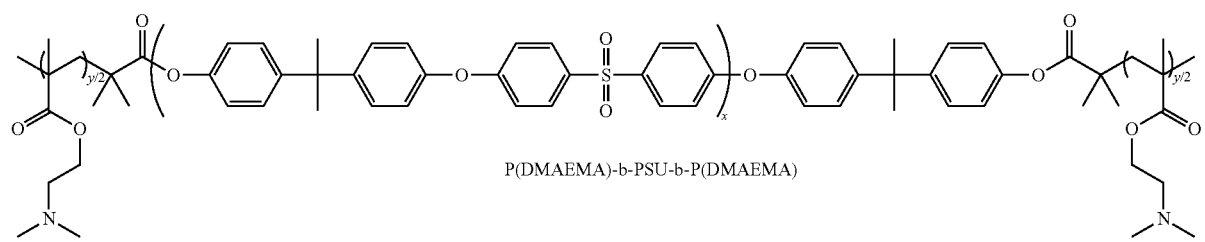
P(DMAEMA)-b-PSU-b-P(DMAEMA)

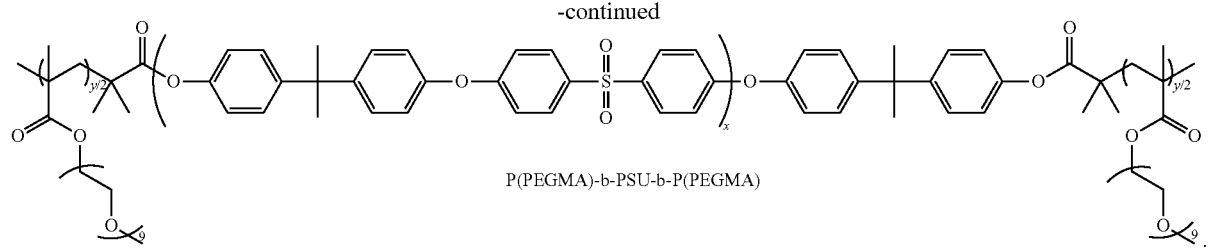
P(PEGMA)-b-PSU-b-P(PEGMA)
10. The separation matrix of claim 1, wherein the A-B-A block copolymer is:
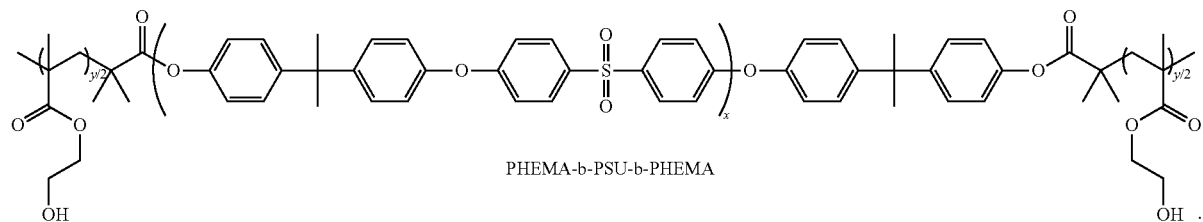
PHEMA-b-PSU-b-PHEMA
11. The separation matrix of claim 1, wherein the A-B block copolymer is:
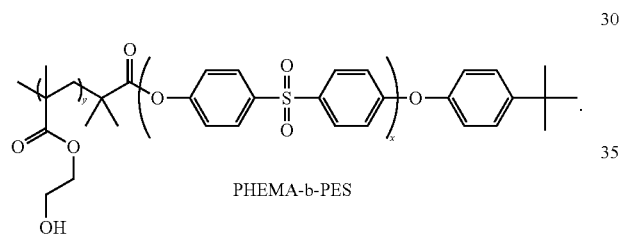
PHEMA-b-PES
* * * * *